(12) United States Patent
Mendoza et al.

(10) Patent No.: US 12,381,276 B2
(45) Date of Patent: Aug. 5, 2025

(54) STEEL BATTERY HOUSING AND METHODS OF MANUFACTURING THEREOF

(71) Applicant: TERNIUM MEXICO S.A. de C.V., Nuevo Leon (MX)

(72) Inventors: Yussef Nesme Mendoza, Nuevo Leon (MX); Arturo Eduardo Aranda Sánchez, Nuevo Leon (MX); Juan Pablo Pedraza, Nuevo Leon (MX); Rafael David Mercado Solís, Nuevo Leon (MX); Efraín Gerardo Rodríguez, Nuevo Leon (MX)

(73) Assignee: TERNIUM MEXICO S.A. de C.V., Nuevo Leon (MX)

( * ) Notice: Subject to any disclaimer, the term of this patent is extended or adjusted under 35 U.S.C. 154(b) by 0 days.

(21) Appl. No.: 18/671,904

(22) Filed: May 22, 2024

(65) Prior Publication Data

US 2024/0396124 A1    Nov. 28, 2024

Related U.S. Application Data

(60) Provisional application No. 63/504,126, filed on May 24, 2023.

(51) Int. Cl.
| | |
|---|---|
| *H01M 50/207* | (2021.01) |
| *H01M 50/119* | (2021.01) |
| *H01M 50/128* | (2021.01) |
| *H01M 50/133* | (2021.01) |
| *H01M 50/14* | (2021.01) |

(52) U.S. Cl.
CPC ......... *H01M 50/14* (2021.01); *H01M 50/119* (2021.01); *H01M 50/128* (2021.01); *H01M 50/133* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 8,702,161 B2 | 4/2014 | Charbonneau et al. | |
| 10,160,492 B2 | 12/2018 | Fees et al. | |
| 10,723,234 B2 | 7/2020 | Günther | |
| 10,843,577 B2 | 11/2020 | Günther et al. | |

(Continued)

FOREIGN PATENT DOCUMENTS

| | | | |
|---|---|---|---|
| CN | 110137395 B | 6/2022 | |
| DE | 102016115037 A1 | 2/2018 | |
| WO | WO-2022098006 A1 * | 5/2022 | ............... B60K 1/04 |

OTHER PUBLICATIONS

International Search Report and Written Opinion received in PCT/US2024/030621 mailed on Aug. 19, 2024.

(Continued)

*Primary Examiner* — Yoshitoshi Takeuchi
(74) *Attorney, Agent, or Firm* — Knobbe, Martens, Olson & Bear, LLP

(57) ABSTRACT

A steel battery housing for a vehicle including an internal crash structure attached to two side crash structures. Each crash structure comprises a first plate, a second plate, and a third plate. The crash section of each plate includes a first portion, two secondary portion which extend from the first portion at a first angle, and flange portions which extend from each secondary portion at a second angle.

18 Claims, 26 Drawing Sheets

(56) References Cited

U.S. PATENT DOCUMENTS

| | | | |
|---|---|---|---|
| 10,886,513 | B2 | 1/2021 | Stephens et al. |
| 11,201,370 | B2 | 12/2021 | Hilfrich et al. |
| 2018/0287227 | A1 | 10/2018 | Jeong et al. |
| 2023/0420778 | A1* | 12/2023 | Seok ................... H01M 50/244 |

OTHER PUBLICATIONS

An et al., "Strength analysis of the lightweight-designed power battery boxes in electric vehicle", E3S Web of Conferences 341, pp. 1-7, 2022.
Arora et al., "Mechanical design and packaging of battery packs for electric vehicles" Springer, pp. 175-200, 2018.
Arora et al., "Application of robust design methodology to battery packs for electric vehicles: identification of critical technical requirements for modular architecture", Batteries, vol. 4, pp. 1-25, 2018.
Arora et al., "Design of a modular battery pack for electric vehicles", Swinburne University of Technology Hawthorn Australia, 2017.
Bala et al., "Design and Optimization of Battery Housing in Electric Cars", Chalmers University of Technology, 2020.
Chen et al., "Design of Open Battery Pack Interface for Electric Vehicle Personalization", Springer, pp. 597-610.
Chen et al., "Research on Battery Box Lightweight Based on Material Replacement", Advances in Engineering Research, vol. 141, pp. 346-358, 2017.
Chombo et al., "Lessons from the electric vehicle crashworthiness leading to battery fire", Energies, vol. 14, pp. 1-21, 2021.
Coren et al., "Crashworthiness of C-Smc: A Structural Battery Case for Automotive Application", FISITA Web Congress, pp. 1-10, 2020.
Czerwinski, "Current trends in automotive lightweight strategies and materials", Materials, vol. 14, pp. 1-27, 2021.
Danzi et al., "A Review of Structural Batteries with Carbon Fibers", Molecules, vol. 26, pp. 1-40, 2021.
Dhoke et al., "A Critical Review on Lightweight Design of Battery Pack Enclosure for Electric Vehicles", Internation Journal of Sustainable Transportation Technology, vol. 4, Issue 2, 2021.
Fauzi et al., "Composite based lightweight structure design for crash and safety application", 5th International Conference on Electric Vehicular Technology (ICEVT), pp. 161-166, 2018.
Gilaki, "Design for safety Characterization of Structural Impact on Lithium-ion batteries", University of Wisconsin-Milwaukee, pp. 1-124, 2017.
Gültekin et al., "Investigation of Lattice Structures for the Battery Pack Protection", International Journal of Automotive Science and Technology, vol. 5, Issue 4, pp. 331-338, 2021.
Hao et al., "Crashworthiness analysis of electric vehicle with energy-absorbing battery modules", Journal of Engineering Materials and Technology, vol. 139, 2017.
Irawan et al., "Sandwich Panel Composite Based Light-Weight Structure Design for Reserved Energy Storage System (RESS) Protection" 6th International Conference on Electric Vehicular Technology (ICEVT), pp. 124-134, 2019.
Jeong et al., "Nonlinear dynamic response structural optimization for the structure integrating the body-white and battery pack of an electric vehicle considering a side pole impact test", KSAE, vol. 29, Issue 7, pp. 683-691, 2021.
Jönsson et al., "Packaging concepts of an energy storage system for a fully electric heavy-duty truck", Chalmers University of Technology, 2018.
Kongwat et al., "Design for crash safety of electric heavy quadricycle structure", IOP Conf. Series: Materials Science and Engineering, vol. 1137, 2021.
Kukreja, "Crash analysis of a conceptual electric vehicle with a multifunctional battery system", Purdue University, 2015.
Li et al., "Lightweight and crashworthiness design of an electric vehicle using a six-sigma robust design optimization method", Engineering Optimization, pp. 1-19, 2018.
Li et al., "Intelligent optimization methodology of battery pack for electric vehicles: A multidisciplinary perspective", International Journal of Energy Research, pp. 1-21, 2020.
Lindner et al., "Increased safety for battery electric vehicles by using heat-resistance stainless steels", Springer, pp. 673-683, 2020.
Liu et al., "Reliability-based design optimization of composite battery box based on modified particle swarm optimization algorithm", Accepted Manuscript to Composite Structures, 2018.
Luttenberger et al., "Structural analysis of body in white for battery integration using finite element and macro element with the focus on pole crash optimization", European Congress on Computational Methods in Applied Sciences and Engineering (ECCOMAS), 2012.
Ma et al., "Reliability optimization of a large-size tubular negative poissons ratio battery protection structure", Journal of Mechanical Engineering Science, pp. 1-17, 2020.
Masli et al. "Rectangular crash boxes implementation on impact energy absorbing system for lightweight rail vehicle application", 6th International Conference on Electric Vehicular Technology (ICEVT), pp. 225-230, 2019.
Mudassir et al., "Nature-inspired cellular structure design for electric vehicle battery compartment: application to crashworthiness", Applied Sciences, pp. 1-23, vol. 10, 2020.
Mushtaq et al., "A Review on Crashworthiness and Cooling Models for Lithium-Ion Batteries in Electric Vehicles", Springer, pp. 75-84, 2020.
Nasrullah et al., "The Concept of Sandwich Panel Structures for Battery Protections in Electric Vehicles Subjected to Ground Impact", Materials, vol. 14, pp. 1-19, 2021.
Navale et al., "Crashworthiness aspects of electric vehicle design", International Journal of Crashworthiness, pp. 1-20, 2020.
Nirmala et al., "Design study of battery system protection structure based on hybrid material fiber metal laminate FML", 6th International Conference on Electric Vehicular Technology (ICEVT), pp. 163-169, 2019.
Pan et al., "Crush and crash analysis of an automotive battery-pack enclosure for lightweight design", International Journal of Crashworthiness, pp. 1-10, 2020.
Pratama et al., "Design and Numerical Analysis of Electric Vehicle Li-Ion Battery Protections Using Lattice Structure Undergoing Ground Impact", World Electric Vehicle Journal, 2022.
Qiao et al., "Study on Side Collision of Battery Boxes Based on HyperWorks", Journal of Physics: Conference Series, vol. 2137, pp. 1-9, 2021.
Rosso, "Efficient Design of Integrated Underbody and Battery Pack for Battery Electric Vehicles", University of Windsor, pp. 1-167, 2021.
Sankaran et al., "Standardization of electric vehicle battery pack geometry form factors for passenger car segments in India", Journal Power Sources, vol. 502, pp. 1-12, 2021.
Schludi et al., "Lightweight and safe composite battery housings" Design Battery Housing, vol. 12, pp. 44-47, 2019.
Schmerler et al., "Multifunctional FRP-Aluminum Foam Production Setup for Battery Housings of Electric Vehicles", Technologies for Lightweight Structures, vol. 4, Issue 1, pp. 9-17, 2020.
Scurtu et al., "Numerical analysis of the influence of mechanical stress on the battery pack's housing of an electric vehicle", IOP Conference Series: Materials Science and Engineering, vol. 568, 2019.
Setiawan et al., "Crashworthiness Design for an Electric City Car against Side Pole Impact.", J. Eng. Technol. Sci., vol. 49, Issue 5, pp. 587-603, 2017.
Shui et al., "Design optimization of battery pack enclosure for electric vehicle", Springer, Structural and Multidisciplinary Optimization, 2018.
Uerlich et al., "Finite element analysis considering packaging efficiency of innovative battery pack designs", International Journal of Crashworthiness, pp. 1-16, 2019.
Xiaoyu et al., "Lightweight design and static strength analysis of battery box for electric vehicle", 21st International Conference on Composite Materials, 2017.
Xiong et al., "Effective weight-reduction and crashworthiness analysis of a vehicles battery pack system via orthogonal experimental

(56) References Cited

OTHER PUBLICATIONS design and response surface methodology", Engineering Failure Analysis, vol. 128, pp. 1-15, 2021.

Yang et al., "Dynamic and static analysis of the battery box structure of an electric vehicle", IOP Conf. Series: Materials Science and Engineering, vol. 688, pp. 1-6, 2019.

Ying et al., "Lightweight design of power battery compartments based on implicit full parameterization technology", J Automotive Safety and Energy, vol. 11, Issue 2, pp. 236-242, 2020.

Yu et al., "Application of tailor rolled blanks in optimum design of pure electric vehicle crashworthiness and lightweight", Thin-Walled Structures, vol. 161, pp. 1-13, 2021.

Yuan et al., "Research on lightweight design of power battery cabin in electric vehicle", IOP Conference Series: Earth and Environmental Science, vol. 619, pp. 1-10, 2020.

Zhang et al., "Dependency and correlation analysis of specifications and parameters of products for supporting design decisions", CIRP Annals - Manufacturing Technology, pp. 1-4, 2020.

Zhang et al., "Topology optimization for crashworthiness and structural design of a battery electric vehicle", International Journal of Crashworthiness, pp. 1-10, 2020.

Zhu et al., "Structural designs for electric vehicle battery pack against ground impact", SAE International, pp. 1-8, 2018.

\* cited by examiner

DETAIL B

DETAIL B

| COMPONENT | | | |
|---|---|---|---|
| TOTAL ENERGY ABSORPTION | 7.4% | 21.3% | 54.8% |

| COMPONENT | | | |
|---|---|---|---|
| TOTAL ENERGY ABSORPTION | 2.3% | 3.0% | 9.4% |

STEEL BATTERY HOUSING AND METHODS OF MANUFACTURING THEREOF

INCORPORATION BY REFERENCE TO ANY PRIORITY APPLICATIONS

Any and all applications for which a foreign or domestic priority claim is identified in the Application Data Sheet or PCT Request as filed with the present application are hereby incorporated by reference under 37 CFR 1.57, and Rules 4.18 and 20.6. This application claims the benefit of U.S. Provisional Application No. 63/504,126, filed May 24, 2023, which is hereby incorporated by reference in its entirety.

BACKGROUND

Field

The disclosure relates generally to battery housing structures, in particular, steel battery housings for electric vehicles.

Description of the Related Art

Battery housings structures are used to contain and protect batteries of electric vehicles. Existing solutions to battery housing structures use aluminum or other materials that require expensive, complex and/or heavy machining, and non-sustainable manufacturing and material sourcing methods. There is a need for improvements to these and other drawbacks of typical battery housing structures.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a steel battery housing is provided. The steel battery housing includes an internal crash structure and two side crash structures attached to the internal crash structure, where each side crash structure includes a first plate, a second plate, and a third plate, and where each plate has a cross section including a first portion, two secondary portions that extend from the first portion at a first angle, and flange portions that extend from each secondary portion at a second angle.

In some embodiments, the first plate includes an outward facing omega shaped plate, the second plate includes an inward facing trapeze shaped plate, and the third plate includes an inward facing c-profile shaped plate. In some embodiments, the c-profile plate includes deformation beats. In some embodiments, the first angle of the omega plate is less than or greater than 90 degrees °, for instance 86°, 90°, 94°, and the second angle of the omega plate is less than or greater than 90 degrees, for instance 86°, 90°, 94°. In some embodiments, the first angle of the trapeze plate is greater than about 90°, e.g. 91°, 93°, 95°, and the second angle of the trapeze plate is greater than about 90°, e.g. 91°, 93°, 95°. In some embodiments, the first angle of the c-profile plate is greater than about 90°, e.g. 91°, 93°, 95° and the second angle of the c-profile plate is greater than about 90°, e.g. 91°, 93°, 95°.

In some embodiments, the steel battery housing further includes a lower protection cover. In some embodiments, the steel battery housing further includes an upper protection cover.

In some embodiments, the flange portions of each plate extend in an outwards direction. In some embodiments, the first portion of each plate is oriented substantially vertically. In some embodiments, the flange portions of each plate is oriented substantially vertically. In some embodiments, the first angle of the first plate is substantially similar to the first angle of the third plate. In some embodiments, the first angle of each plate is substantially similar the second angle of each plate. In some embodiments, the side crash structure includes a front cover. In some embodiments, the side crash structure includes a rear cover.

BRIEF DESCRIPTION OF THE DRAWINGS

FIG. 6-1 is an exploded view illustration of the steel battery housing, according to some embodiments.

FIG. 7A-1 is a left side view illustration of the steel battery housing, according to some embodiments.

FIG. 7B-1 is a right side view illustration of the steel battery housing, according to some embodiments.

FIG. 7C-1 is a distal side view illustration of the steel battery housing, according to some embodiments.

FIG. 7D-1 is a proximal side view illustration of the steel battery housing, according to some embodiments.

FIG. 8A-1 is a bottom view illustration of the steel battery housing, according to some embodiments.

FIG. 8B-1 is a cross sectional side view illustration of the battery housing of FIG. 8A-1, according to some embodiments.

FIG. 8C-1 is a close-up view illustration of a c-profile bar of the cross sectional side view of FIG. 8B-1, according to some embodiments.

FIG. 8D-1 is a cross sectional distal side view illustration of the battery housing of FIG. 8A-1, according to some embodiments.

FIG. 8E-1 is a close-up view illustration of a side crash structure of the cross sectional distal view of FIG. 8D-1, according to some embodiments.

FIG. 10-1 is a perspective view illustration of a rear cover of the side crash structure, according to some embodiments.

DETAILED DESCRIPTION

The present disclosure relates to steel battery housings and architectures thereof. Utilizing steel as the material for manufacturing battery housings can be beneficial over other metals, such as aluminum, at least due to its improved heat resistance, mechanical safety, case of manufacturing, and sustainability. Steel is more heat resistant than aluminum in that the melting point of steel is more than double that of aluminum. Further, the thermal conductivity of steel is roughly one fifth the thermal conductivity of aluminum. Batteries, such as lithium-ion batteries, have been known to overheat and pose a risk to drivers, and therefore the thermal benefits of steel provide a greater safety than battery housing made from aluminum. Further, steels are known to have a higher elastic limit and critical stress limit in comparison to aluminum, which results in the ability of steel to absorb more energy before it permanently deforms. Additionally, manufacturing sheet metal steel, such as stamping and folding, is typically easier to perform than casting aluminum. Further, steel may generally be resistant to corrosion whereas aluminum typically requires heat treatment or a special coating in order to have sufficient corrosion resistant properties. Alloys used in steel are also easier to mine and extract and are found in greater abundance than those used for aluminum alloys. Finally, the recycling process for steel is more simple and more efficient than that of aluminum.

In some embodiments, the battery housing benefits from improved material and/or structural properties of advanced steels, such as high rigidity and high strength. This allows for components of the housing to be constructed with relatively thin thicknesses without compromising safety. In some embodiments, unique cross sections of the components of the battery housing take advantage of the energy absorption and stiffness of the steels used in construction. In some embodiments, the battery housing also serves to reinforce the stiffness of the vehicle chassis and protects the vehicle battery against crash loads. In some embodiments, the battery housing may provide multiple benefits to an electric vehicle, including reinforcing the chassis, helping to absorb and distribute energy from events such as collisions or impacts, and/or providing thermal protection to the batteries.

Figure 1:
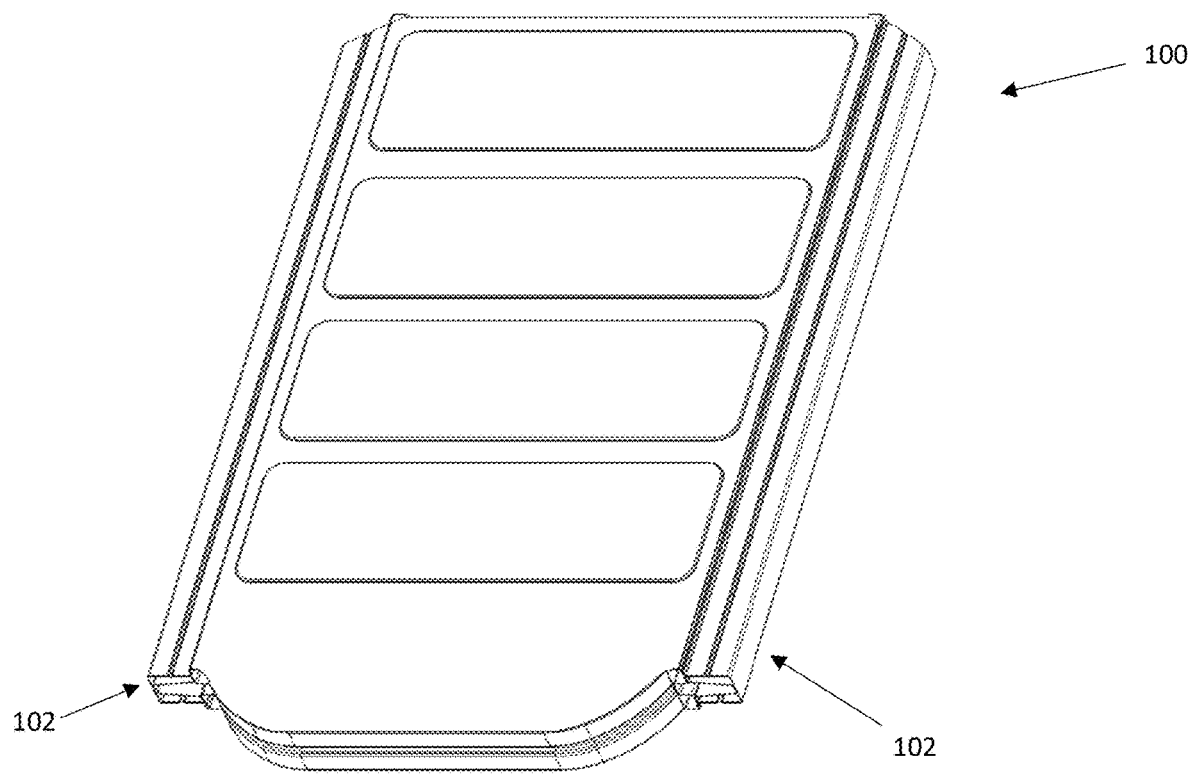
FIG. 1 is a perspective view illustration of a steel battery housing, according to some embodiments.

FIG. 1 shows a perspective view of a steel battery housing 100 in an assembled state. A shown, a side crash structure 102 is located on each side of the steel battery housing 100.

Figure 2:
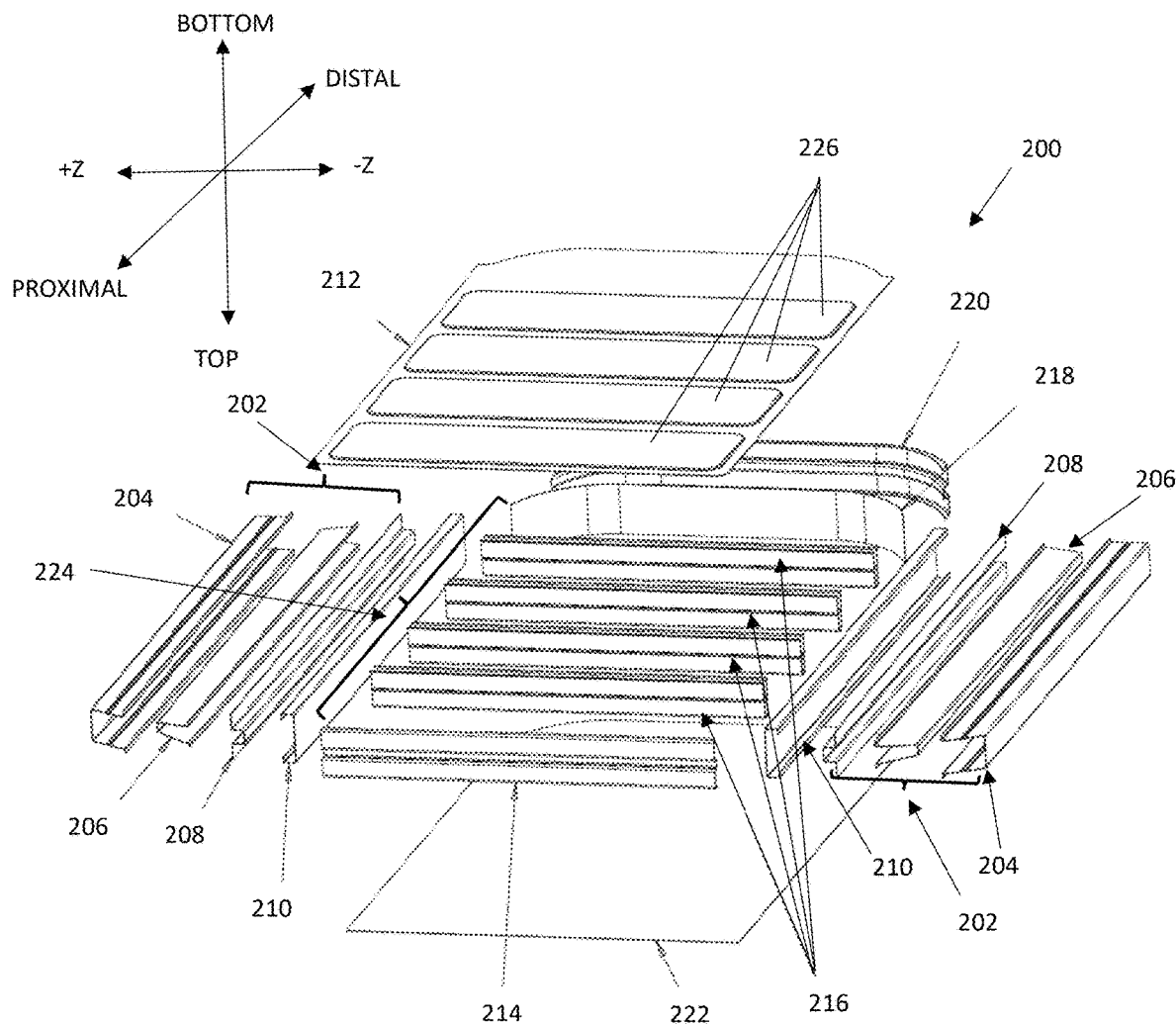
FIG. 2 is an exploded view illustration of the steel battery housing, according to some embodiments.

FIG. 2 shows an exploded view of the components a steel battery housing 200 according to some embodiments. The steel battery housing 200 includes an internal crash structure, two side crash structures 202, a lower protection cover 212, and a upper protection cover 222. In some embodiments, the internal crash structure and side crash structure 202 include further components. As described herein, a front of the steel battery housing 200 is in a distal direction while a back of the steel battery housing 200 is in a proximal direction.

The internal crash structure includes two side cross members 210, a rear cross member 214, a front plate 218, a front cross member 220, four c-profile bars 216, and a battery compartment 224. The two side cross members 210 are positioned parallel one another. Each side cross member 210 comprises an inside surface and an outside surface, wherein the outside surface faces away from the opposing side cross members 210. The rear cross member 214 is positioned between, and perpendicular to, the two side cross members 210. The rear cross member 214 is attached to each of the two side cross members 210 at or near the two side cross members' 210 proximal ends. In some embodiments, the rear cross member 214 is attached to an inside surface of the two side cross members 210. A front plate 218 is positioned between, and oriented substantially perpendicular to, the two side cross members 210 near a distal end. The front plate 218 is attached to the two side cross members 210. In some embodiments, the front plate 218 is attached to the inside surface of each of the two side cross members 210. The front plate 218 is shown curved such that it bows in the distal direction away from the steel battery housing 200. A front cross member 220 is positioned distally and adjacent to the front plate 218. The front cross member 220 is shown with a similar shape as the front plate 218, and is shown bowing away from the steel battery housing 200 in the distal direction. The front cross member 220 is attached to the front plate 218. In some embodiments, an inside surface of the front cross member 220 is attached to an outside surface of the front plate 218. In some embodiments, the front plate 218 and front cross member 220 are not attached. The battery compartment 224 is bounded by the two side cross members 210, the rear cross member 214, and the front plate 218. The battery compartment 224 is divided into sections by four c-profile bars 216 positioned perpendicular to, and between, the two side cross members 210. The four c-profile bars 216 are attached to the two side cross members 210. In some embodiments, the number of c-profile bars may be 1, 2, 3, 4, 5, 6, 7, 8, 9 or 10, or any range of values therebetween. In some embodiments, the four c-profile bars 216 are attached to the inside surface of the two side cross members 210. The battery compartment 224 is configured to house batteries or battery modules, such as those used for powering an electric vehicle. The internal crash structure serves to distribute loads in an impact scenario and increase the rigidity of the steel battery housing 200. The lower protection cover 212 delimits a bottom of the battery compartment. The lower protection cover 212 is positioned adjacent to and on a bottom side of the internal crash structure. The lower protection cover 212 may be attached to at least one of the components of the internal crash structure. In some embodiments, the lower protection cover 212 protects batteries within the battery compartment against impacts from below. In some embodiments, the lower protection cover 212 protects batteries within the battery compartment against debris (e.g., dirt, water, oil, dust).

The lower protection cover 212 is shown comprising four rectangular sections 226 that protrude from an outer surface. Each rectangular section 226 is shown with a thickness that is greater than the remaining surface of the lower protection cover 212. These rectangular sections 226 are made of the same or a different material as the rest of the lower protection cover 212. In some embodiments, the rectangular sections 226 are sheet metal that has been welded onto the lower protection cover 212.

The upper protection cover 222 delimits a top of the battery compartment. It is positioned adjacent to and on a top side of the internal crash structure. The upper protection cover 222 may be attached to some or all of the components of the internal crash structure. The upper protection cover 222 may be used as a floor of a cabin vehicle.

Each side crash structure 202 comprises an omega plate 208, a trapeze plate 206, and a c-profile plate 204. The steel battery housing 200 includes two side crash structures 202, wherein each side crash structure 202 is positioned adjacent to and parallel with each side cross member 210. Each side crash structure 202 is attached to an outside surface of the side cross members 210. The side crash structure 202 is configured to protect the battery housing 224 from side impacts.

The steel battery housing 200 may provide multiple benefits to an electric vehicle. The steel battery housing 200 may reinforce the chassis to provide structural support to the vehicle. Further, it may help to absorb and distribute energy from events such as collisions or impacts. The steel battery housing 200 may also provide thermal protection to the batteries.

Figure 3A:
FIG. 3A is a left side view illustration of the steel battery housing, according to some embodiments.
Figure 3B:
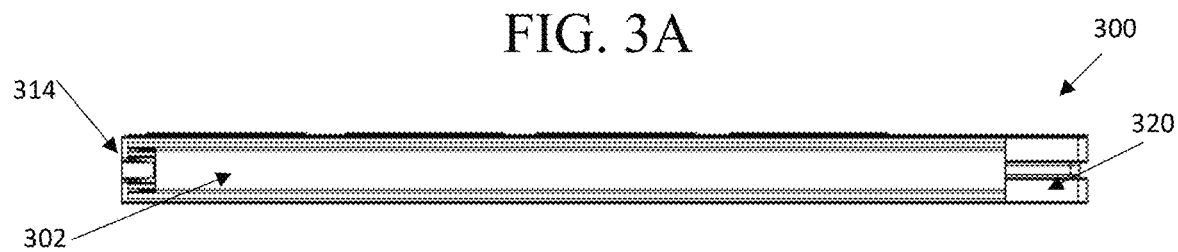
FIG. 3B is a right side view illustration of the steel battery housing, according to some embodiments.
Figure 3C:
FIG. 3C is a distal side view illustration of the steel battery housing, according to some embodiments.
Figure 3D:
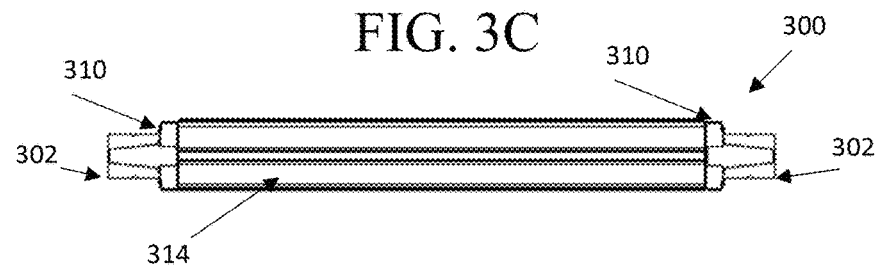
FIG. 3D is a proximal side view illustration of the steel battery housing, according to some embodiments.

FIGS. 3A-3D show side views of a steel battery housing 300. FIG. 3A shows a left-side view of the steel battery housing 300 as shown from the +Z side of the battery housing (axis shown in FIG. 2). FIG. 3B shows a right-side view of the steel battery housing 300 as shown from the −Z side of the battery housing. A front cross member 320 is located on a distal side of the steel battery housing 300 and a rear cross member 314 is located on a proximal side of the steel battery housing 300. Two side crash structure 302 are shown extending between the proximal and distal sides. A length of the side crash structures 302, extending along the proximal/distal axis, is shorter than a length of the steel battery housing 300 extending along the same axis. FIG. 3C shows a distal-side view of the steel battery housing. FIG. 3D shows a proximal-side view of the steel battery housing. Each side crash structure 302 is shown attached to a side cross member 310.

Figure 4A:
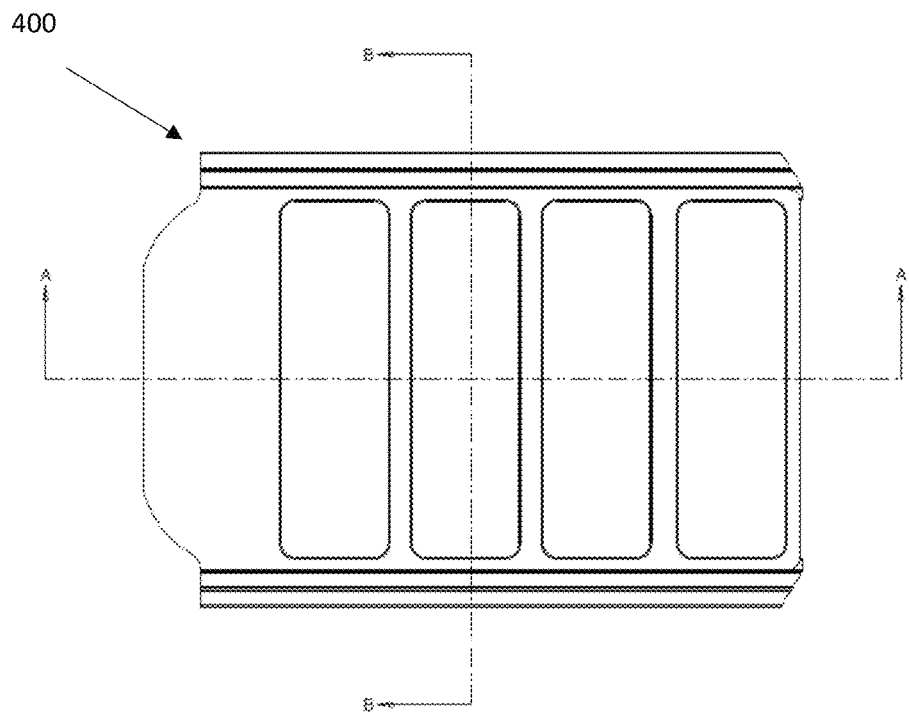
FIG. 4A is a bottom view illustration of the steel battery housing, according to some embodiments.
Figure 4B:
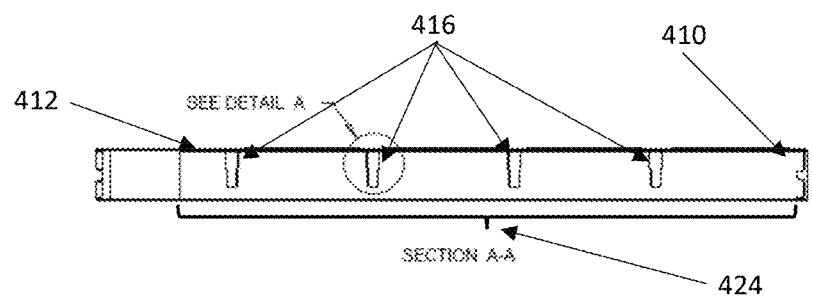
FIG. 4B is a cross sectional side view illustration of the battery housing of FIG. 4A, according to some embodiments.

FIG. 4A is a bottom view of a steel battery housing 400, which includes section A-A and section B-B. FIGS. 4B-4E show several cross-sectional views of the steel battery housing 400. FIG. 4B is a cross-sectional side view of section A-A of the steel battery housing 400, which includes a detail A portion of a c-profile bar 416. A battery compartment 424 configured to hold batteries or battery modules is shown. Four c-profile bars 416 are located within the battery compartment 424. Each of the four c-profile bars 416 are positioned adjacent to a lower protection cover 412. In some embodiments, the c-profile bar 416 may connect elements on both side cross members 410 and separate the battery compartment 424 into sections.

Figure 4C:
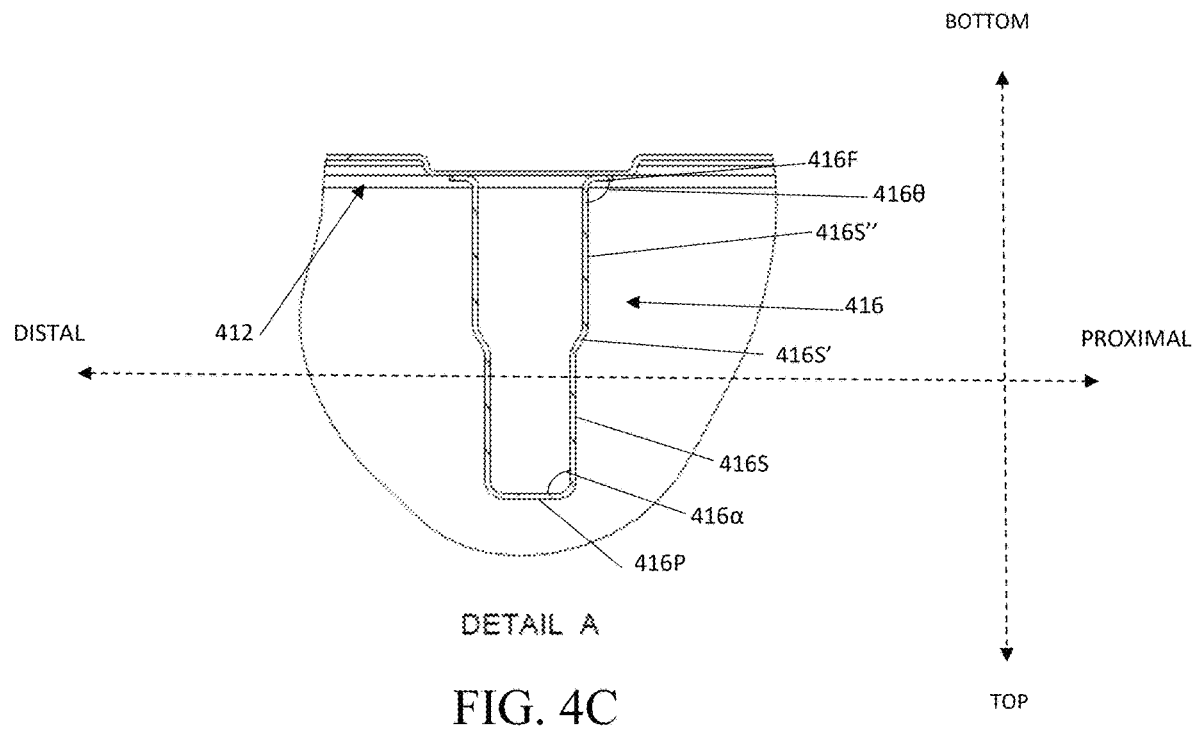
FIG. 4C is a close-up view illustration of a c-profile bar of the cross sectional side view of FIG. 4B, according to some embodiments.

FIG. 4C is a close-up view of the c-profile bar 416 shown in detail A of FIG. 4B. The cross-section of the c-profile bar 416 includes a primary portion 416P which is oriented in a horizontal direction perpendicular to the bottom/top-axis. For purposes of describing the embodiment of this figure, "outward" describes a direction away from the primary portion and along the distal/proximal-axis, and "inwards" describes a direction towards the primary portion, and along the distal/proximal-axis. Two secondary portions 416S extend from either end of the primary portion 416P in a vertical direction, perpendicular to the proximal/distal-axis, and toward the lower protection cover 412. A third portion 416S' extends outward from each secondary portion 416S, in a non-vertical direction, and towards the lower protection cover 412. A fourth portion 416S" extends from each third portion 416S' in a vertical direction and toward the lower protection cover 412. A flange portion 416F extends outward from each fourth portion 416S" in a horizontal direction. The flange portion 416F is attached to the lower protection cover 412.

A first angle 416α defines the primary portion 416P relative to the two secondary portions 416S. A second angle 416θ defines the two flange portions 416F relative to the two fourth portions 416S". As shown, both angles are 90 degrees. In some embodiments, the first and/or second angles (416α, 416θ) are greater than 90 degrees but less than 180 degrees. In some embodiments, the first and/or second angles (416α, 416θ) are less than 90 degrees but more than 0 degrees. In some embodiments, the primary portion is angled such that the orientation is between vertical and horizontal. In some embodiments, the two secondary portions and/or the two fourth portions are angled such that the orientation is between vertical and horizontal.

Figure 4D:
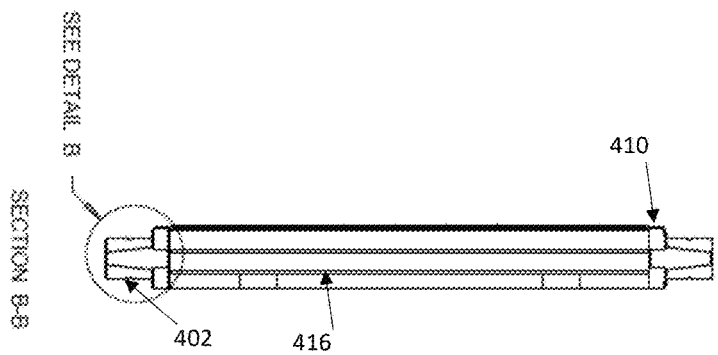
FIG. 4D is a cross sectional distal side view illustration of the battery housing of FIG. 4A, according to some embodiments.

FIG. 4D is a cross-sectional distal-side view of section B-B of the battery housing 400, which includes a detail B portion of a side crash structure 402. As shown in FIG. 4D, c-profile bar 416 extends horizontally and is positioned between two side cross members 410. A side crash structure 402 is attached to each side cross member 410.

Figure 4E:
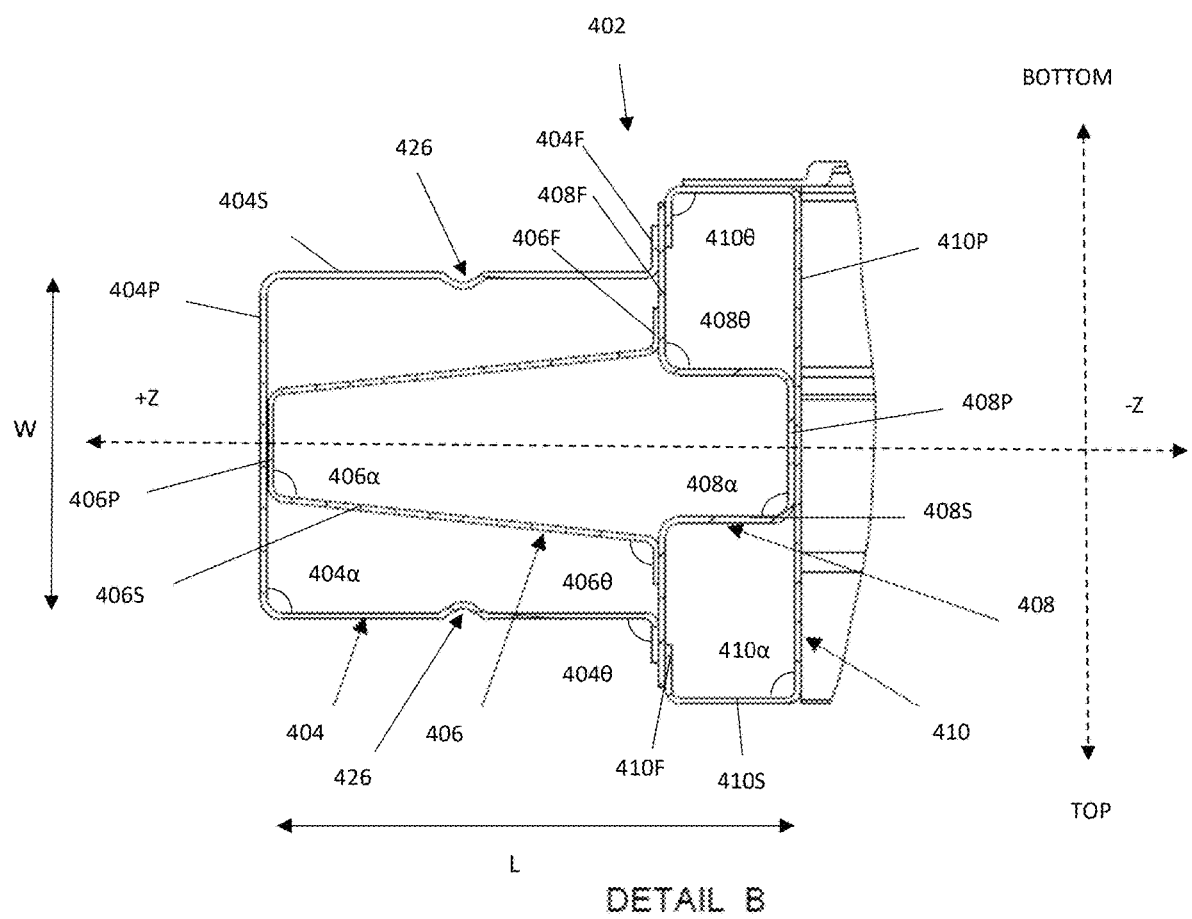
FIG. 4E is a close-up view illustration of a side crash structure of the cross sectional distal view of FIG. 4D, according to some embodiments.

FIG. 4E is a close-up view of a side crash structure 402 of detail B in FIG. 4D, and shows the cross section of the side crash structure 402. The side crash structure 402 includes an omega plate 408, a trapeze plate 406, and a c-profile plate 404. The side crash structure 402 is attached to the side cross member 410.

For the purposes of the embodiment in this figure, an z-axis bisects the side crash structure 402 into an upper and lower portion. "Vertical" is used to describe an orientation perpendicular to the z-axis while "horizontal" is used to define a direction parallel with the z-axis. In some embodiments, the upper portion is symmetrical with the lower portion. In some embodiments the portions are asymmetrical. The term "inwards" is used to describe a direction that is towards the z-axis and the term "outwards" describes a direction away from the z-axis. Likewise, "inwards" is used to describe a direction towards a battery compartment, or in the −z direction, while "outwards" describes a direction away from the battery compartment, or in a +z direction.

FIG. 4E shows cross sections of each of the components of the side crash structure 402 and the side cross member 410, which include a primary portion, denoted with a P, which transitions to two secondary portions, denoted with an S, each secondary portion transitions to a flange, denoted F. Further, a first angle, α, is the angle between the primary portion and each secondary portion, and a second angle, θ, is the angle between each secondary portion and each flange. Each primary portion is orientated perpendicular to the z-axis. In some embodiments, one or more of the primary portions is not oriented perpendicular to the z-axis. Further, each flange portion is oriented perpendicularly to the z-axis. In some embodiments, one or more of the flange portions is not oriented perpendicular to the z-axis The cross section of the side cross member 410 resembles a c-channel with end flanges angled inwards. As shown, a primary portion 410P is orientated vertically. Two secondary portions 410S extend horizontally from the primary portion 410P at a first angle 410α. The first angle 410α is 90 degrees such that the two secondary portions 410S extend in an outwards direction. Two flanges 410F extend inward from the secondary portions 410S at a second angle 410θ. The second angle 410θ is 90 degrees such that the two flanges 410F extend toward the z-axis. As shown, the flanges 410F are oriented vertically. In some embodiments, the first and/or second angle (410α, 410θ) is less than or greater than 90 degrees. In some embodiments, one and/or both of the secondary portions 410S are not orientated horizontally.

The cross section of the omega plate 408 resembles an omega shape. A primary portion 408P of the omega plate 408 is oriented vertically. Two secondary portions 408S extend horizontally in an outward direction from the primary portion 408P at a first angle 408α. As shown, the first angle 408α is 90 degrees. Two flanges 408F extend outwards from the secondary portions 408S at a second angle 408θ. As shown, the second angle 408θ is 90 degrees and oriented vertically. In some embodiments, one and/or both of the secondary portions 408P are not orientated horizontally. In some embodiments, the first and/or second angle (408α, 408θ) is less than or greater than 90 degrees, e.g., 86°, 90°, 94°.

The cross section of the trapeze plate 406 resembles a trapezoid with end flanges angled outwards. A primary portion 406P of the trapeze plate 406 is oriented vertically. Two secondary portions 406S extend from the primary portion at a first angle 406α. The first angle 406α is greater than 90 degrees and less than 100 degrees, e.g. 91°, 95°, 98° and the two secondary portions 406S extend in an inwards direction. Two flanges 406F extend outwards from the secondary portions 406S at an angle greater than 90 degrees and less than 100 degrees, e.g. 91°, 95°, 98°. As shown, the flanges 406F are orientated vertically. In some embodiments, the first and/or second angle (406α, 408θ) is equal or greater than 85 degrees and equal or less than 95 degrees, e.g. 86°, 90°, 94°. In some embodiments, the flanges 406F are not oriented vertically. In some embodiments, the cross section of the trapeze plate 406 resembles a c-channel.

The cross section of the c-profile plate 404 resembles a c-channel with end flanges angled outwards. A primary portion 404P of the c-profile plate 404 is orientated vertically. Two secondary portions 404S extend in an inwards direction from the primary portion at a first angle 404α. As shown, the first angle 404α is equal or greater than 85 degrees and equal or less than 95 degrees. Two flanges 404F extend outwards from the secondary portions 404S at a second angle 404θ. As shown, the second angle 404θ is equal or greater than 85 degrees and equal or less than 95 degrees and the flanges 404F are oriented vertically. In some embodiments, one and/or both of the secondary portions 404S are not orientated horizontally. In some embodiments, the first and second angle (404α, 404θ) is less than or greater than 90 degrees, e.g. 91°, 93°, 95°. Each secondary portion 404S has a beat 426 that faces outward. In some embodiments, the beat 426 faces inwards. The beat 426 of the lower secondary portion is vertically aligned with the beat of the upper secondary portion. The beats 426 help direct deformation during an impact event and increase deformation resistance of the c-profile plate 404.

In an assembled state, an inside surface of the primary portion 408P of the omega plate 408 is attached to an outside surface of the primary portion 410P of the side cross member 410. An inside surface of the flanges 408F of the omega plate 408 is attached to an outside surface of the flanges 410F of the side cross member 410. The c-profile plate 404 is positioned such that an inside surface of the flanges 404F of the c-profile plate 404 is attached to an outside surface of the flanges 408F of the omega plate 408. The trapeze plate 406 is positioned such that an inside surface of the flanges 406F of the trapeze plate 406 is attached to the outside surface of the flanges 408F of the omega plate 408. An outside surface of the primary portion 406P of the trapeze plate 406 is attached to an inside surface of the primary portion 404P of the c-profile plate 404. The side crash structure 402 is designed to absorb energy from a collision while also retaining the rigidity of the steel battery housing. The components of the side crash structure 402 are designed to deform and distribute energy upon impact with an obstacle such as a vehicle, pole, animal, etc. The unique cross section as shown in FIG. 4E is designed to optimize side impact protection of the steel battery housing.

As an example of an embodiment of any one of FIGS. 1-4E, the battery housing includes the following dimensions and design specifications: The lower protection cover 212 has a thickness of 1.2 mm to 2.2 mm (e.g., 1.3 mm, 1.5 mm, 1.8 mm). The upper protection cover 222 has a thickness of 1.2 mm to 2.2 mm (e.g., 1.3 mm, 1.5 mm, 1.8 mm). The rear cross member 214 has a thickness of 1.2 mm to 2.2 mm (e.g., 1.3 mm, 1.5 mm, 1.8 mm) and inner bend radii of 1.2 to 3.2 mm (e.g., 2.2 mm). The two side cross members 210 have a thickness of 1.2 mm to 2.2 mm (e.g., 1.3 mm, 1.5 mm, 1.8 mm) and inner bend radii of 1.2 to 4.5 mm (e.g., 2.2 mm, 3.2 mm, 4.2 mm). The front plate 218 has a has a thickness of 1.2 mm to 2.2 mm (e.g., 1.8 mm) and inner bend radii of 1.2 mm to 4.5 mm (e.g., 2.2 mm, 3.2 mm, 4.2 mm). The front cross member 220 has a thickness of 1.2 mm to 2.2 mm (e.g., 1.3 mm, 1.6 mm, 2 mm) and inner bend radii of 2 mm to 4 mm (e.g., 2.5 mm, 3.1 mm, 3.6 mm). The omega plate 208 has a thickness of 1.2 mm to 2.2 mm (e.g., 1.8 mm) and inner bend radii of 3 mm to 5 mm (e.g., 3.5 mm, 4 mm, 4.5 mm). The trapeze plate 206 has a thickness of 1.2 mm to 2.2 mm (e.g., 1.8 mm) and inner bend radii of 2 mm to 5.5 mm (e.g., 2.5 mm, 3 mm, 4.2 mm, 5 mm, 5.4 mm). The c-profile plate 204 has a thickness of 1.2 mm to 2.2 mm (e.g., 1.8 mm) and inner bend radii of 8 mm to 10 mm (e.g., 8.2 mm, 9.1 mm, 9.6 mm). The four c-profile bars 216 have a thickness of 1.2 mm to 2.22 mm (e.g., 1.8 mm) and inner bend radii of 3 mm to 8.5 mm (e.g., 4.1 mm, 5 mm, 8.2 mm). Further, the lower protection cover 212 is comprised of HSLA steel sheet metal of up to 550 Mpa yield strength (YS) and is attached to one or more of components of the internal crash structure via arc welding and/or resistance spot welding. The upper protection cover 222 is comprised of HSLA steel sheet metal of up to 550 Mpa YS and is attached to one or more components of the internal crash structure via fasteners. The internal crash structure is comprised of AHSS steel sheet metal of up to 1200 Mpa ultimate tensile strength (UTS) and the components of the internal crash structure are attached via arc welding and/or spot welding. The side crash structure 202 is comprised AHSS steel sheet metal of up to 980 Mpa UTS and the components of the side crash structure are attached via arc welding and/or spot welding. The four c-profile bars four c-profile bars 216 of the internal crash structure may be comprised of the same steel as the side crash structure 202.

Figure 5:
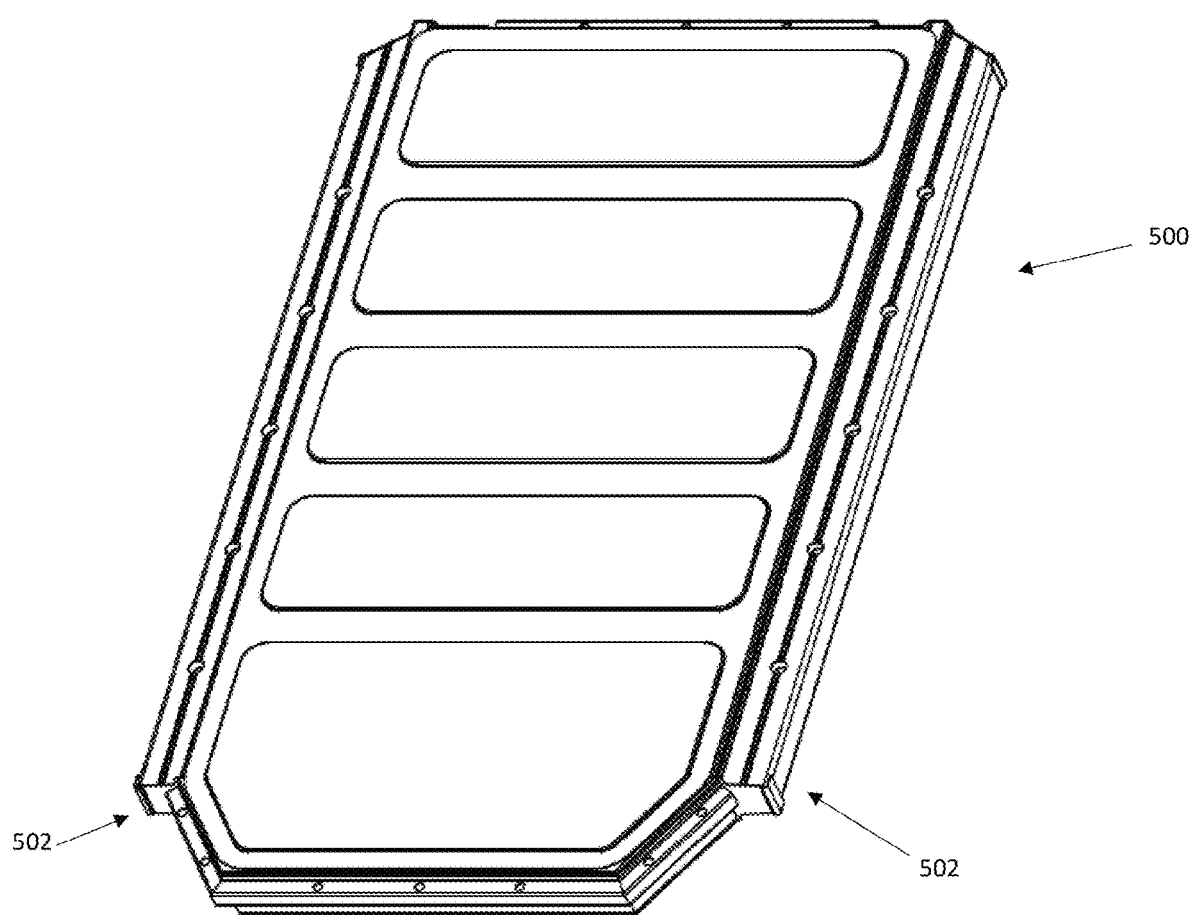
FIG. 5 is a perspective view illustration of a steel battery housing, according to some embodiments.

FIG. 5 shows a perspective view of another example of a steel battery housing 500 in an assembled state. A shown, a side crash structure 502 is located on each side of the steel battery housing 500.

Figure 6:
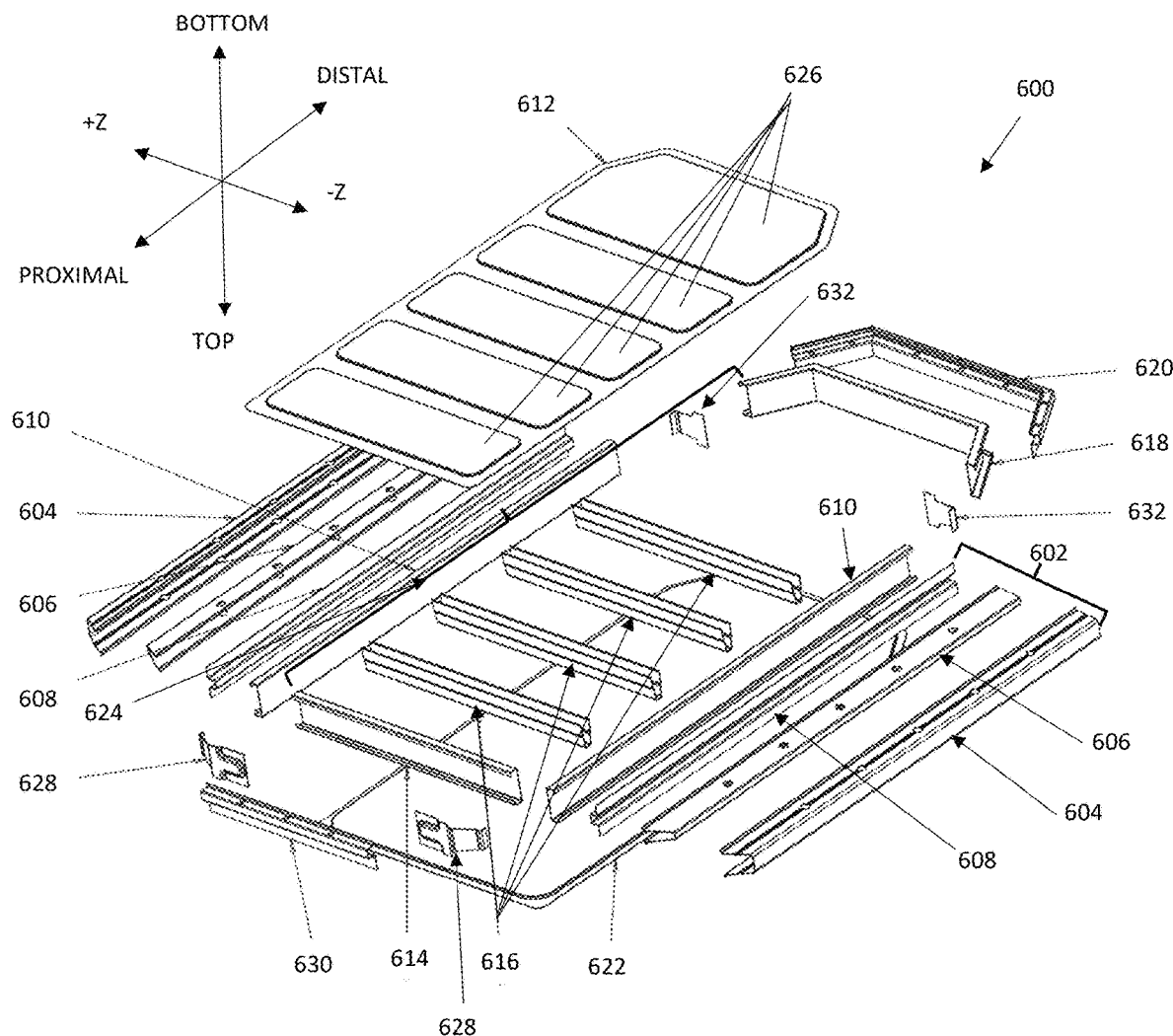
FIG. 6 is an exploded view illustration of the steel battery housing, according to some embodiments.
Figures 1, 6:
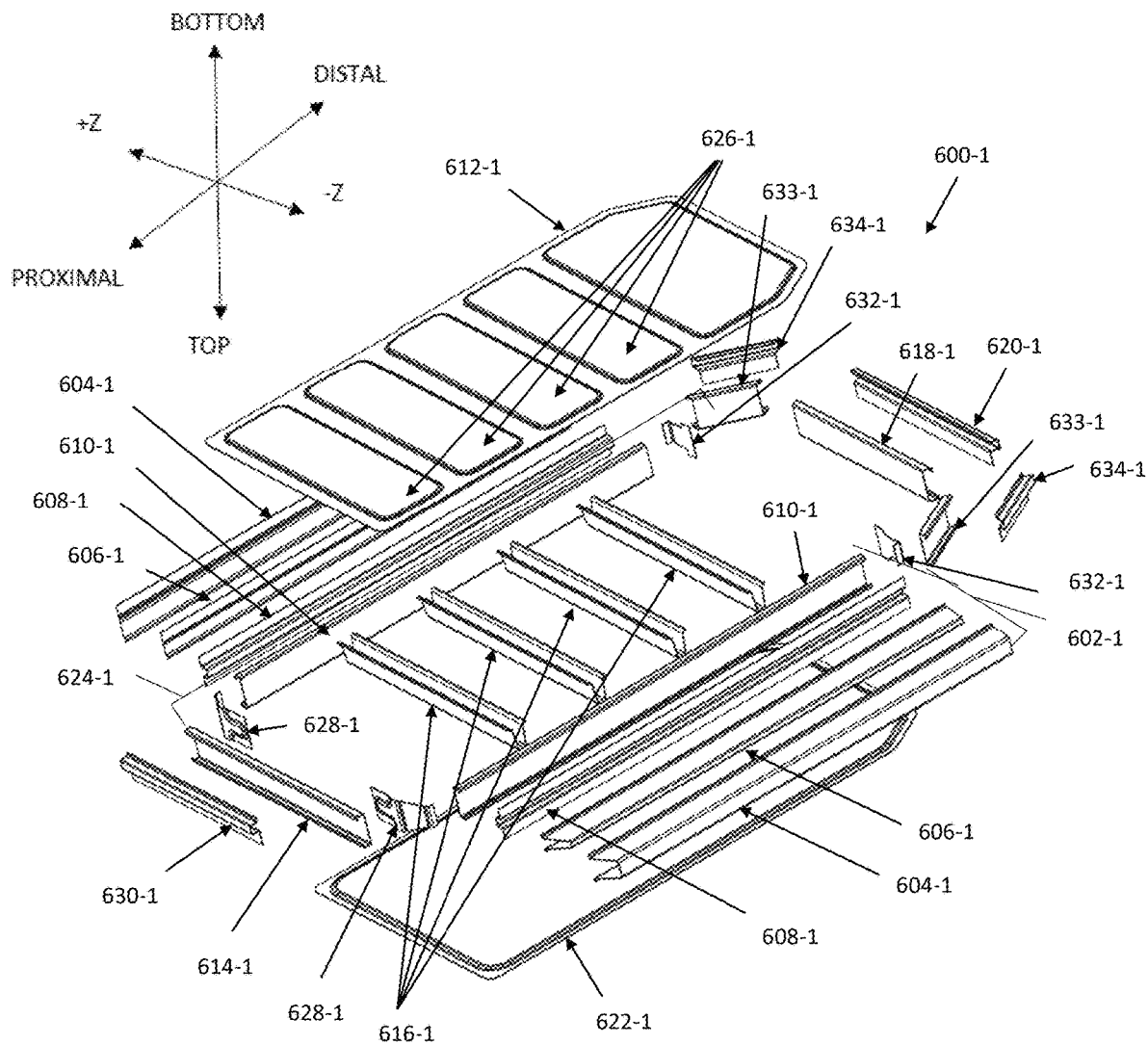

FIG. 6 shows an exploded view of the components of a steel battery housing 600 according to some embodiments. The steel battery housing 600 includes an internal crash structure, two side crash structures 602, a lower protection cover 612 and an upper protection cover 622. In some embodiments, the internal crash structure and side crash structure 602 include further components. As described herein, a front of the steel battery housing 200 is in a distal direction while a back of the steel battery housing 600 is in a proximal direction.

The internal crash structure includes two side cross members 610, a primary rear cross member 630, a secondary rear cross member 614, a front plate 618, a front cross member 620, four c-profile bars 616, and a battery compartment 624. The two side cross members 610 are positioned parallel one another. Each side cross member 610 comprises an inside surface and an outside surface, wherein the outside surface faces away from the opposing side cross members 610. The secondary rear cross member 614 is positioned between, and perpendicular to, the two side cross members 610. The secondary rear cross member 614 is attached to each of the two side cross members 610 at or near the two side cross members' 610 proximal ends. In some embodiments, the secondary rear cross member 614 is attached to an inside surface of the two side cross members 610. The primary rear cross member 630 is positioned parallel the secondary rear cross member 614 and attached to an outside surface of the secondary rear cross member 614. The primary rear cross member 630 is shown as shorter in overall length than the secondary rear cross member 614. A front plate 618 is positioned between, and oriented substantially perpendicular to, the two side cross members 610 near a distal end. The front plate 618 is attached to the two side cross members 610. In some embodiments, the front plate 618 is attached to the inside surface of each of the two side cross members 610. The front plate 618 includes a primary portion which extends parallel the z-axis and two secondary portions extending at an angle from the front portion toward the battery compartment 624. As shown, this angle is greater than 90 degrees but less than 180 degrees. A front cross member 620 is positioned distally and adjacent to the front plate 618. The front cross member 620 is shown with a similar shape as the front plate 618 including a primary portion and two secondary portions which angle toward the battery compartment 624. The front cross member 620 is attached to the front plate 618. In some embodiments, an inside surface of the front cross member 620 is attached to an outside surface of the front plate 618. In some embodiments, the front plate 618 and front cross member 620 are not attached. The battery compartment 624 is bounded by the two side cross members 610, the secondary rear cross member 614, and the front plate 618. The battery compartment 624 is divided into sections by four c-profile bars 616 positioned perpendicular to, and between, the two side cross members 610. The four c-profile bars 616 are attached to the two side cross members 610. In some embodiments, the number of c-profile bars may be 1, 2, 3, 4, 5, 6, 7, 8, 9 or 10, or any range of values therebetween. In some embodiments, the four c-profile bars 616 are attached to the inside surface of the two side cross members 610. The battery compartment 624 is configured to house batteries or battery modules, such as those used for powering an electric vehicle. The internal crash structure serves to distribute loads in an impact scenario and increase the rigidity of the steel battery housing 600.

The lower protection cover 612 delimits a bottom of the battery compartment. The lower protection cover 612 is positioned adjacent to and on a bottom side of the internal crash structure. The lower protection cover 612 may be attached to at least one of the components of the internal crash structure. In some embodiments, the lower protection cover 612 protects batteries within the battery compartment against impacts from below. In some embodiments, the lower protection cover 612 protects batteries within the battery compartment against debris (e.g., dirt, water, oil, dust).

The lower protection cover 612 is shown comprising five rectangular or polygon shaped sections 626 that protrude from an outer surface. Each rectangular section 626 is shown with a thickness that is greater than the remaining surface of the lower protection cover 612. These rectangular sections 626 are made of the same or a different material as the rest of the lower protection cover 612. In some embodiments, the rectangular sections 626 are sheet metal that has been welded onto the lower protection cover 612.

The upper protection cover 622 delimits a top of the battery compartment. It is positioned adjacent to and on a top side of the internal crash structure. The upper protection cover 622 may be attached to some or all of the components of the internal crash structure. The upper protection cover 622 may be used as a floor of a cabin vehicle.

Each side crash structure 602 comprises an omega plate 608, a trapeze plate 606, and a c-profile plate 604 attached parallel to one another. Each side crash structure 602 further includes a rear cover 628 and a front cover 632. The front cover 632 attaches to a front end of the plates (e.g. 604, 606, 608) while the rear cover 628 attaches at a back end of the plates. The steel battery housing 600 includes two side crash structures 602, wherein each side crash structure 602 is positioned adjacent to and parallel with each side cross member 610. Each side crash structure 602 is attached to an outside surface of the side cross members 610. The side crash structure 602 is configured to protect the battery housing 624 from side impacts.

FIG. 6-1 shows an exploded view of the components of a steel battery housing 600-1 according to some embodiments. The design of the steel battery housing 600-1 is similar to the steel battery housing 600 described above with some differences. The steel battery housing 600-1 includes a side crash structure 602-1, c-profile plates 604-1, trapeze plates 606-1, omega plates 608-1, two side cross members 610-1, a lower protection cover 612-1, a secondary rear cross member 614-1, four c-profile bars 616-1, a front plate 618-1, a front cross member 620-1, a upper protection cover 622-1, a battery compartment 624-1, rectangular sections 626-1, a rear cover 628-1, a primary rear cross member 630-1, and a front cover 632-1.

Notably, the front plate 618-1 includes a primary portion which extends parallel the z-axis, and two additional plates 633-1 (e.g. which may be compared to secondary portions of the front plate 618) attached to the front plate 618-1. Further, the front cross member 620-1 includes a primary portion which extends parallel the z-axis, and two additional members 634-1 (e.g. which may be compared to secondary portions of the front plate 620) may attached to the front cross member 620-1. Further, the c-profile plate 604-1, the trapeze plate 606-1, the front cross member 620-1, and the primary rear cross member 630-1 do not include apertures which traverse the top/bottom direction.

Figure 7A:
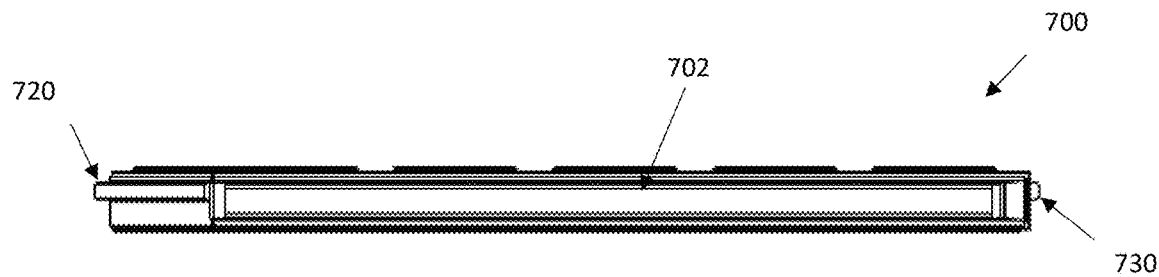
FIG. 7A is a left side view illustration of the steel battery housing, according to some embodiments.
Figures 1, 7A:
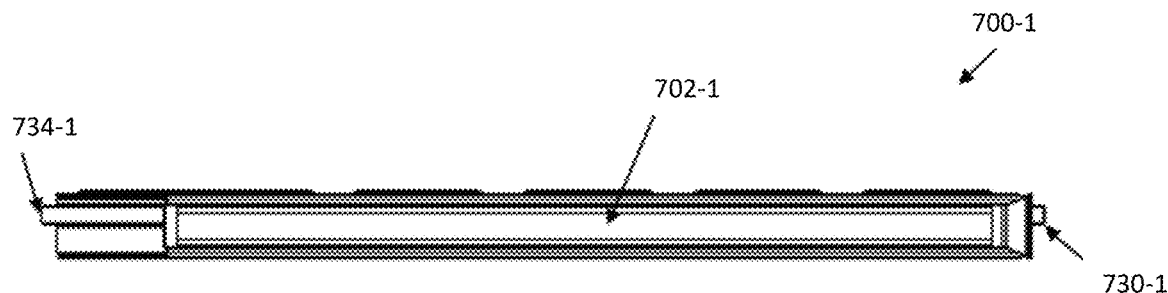
Figure 7B:
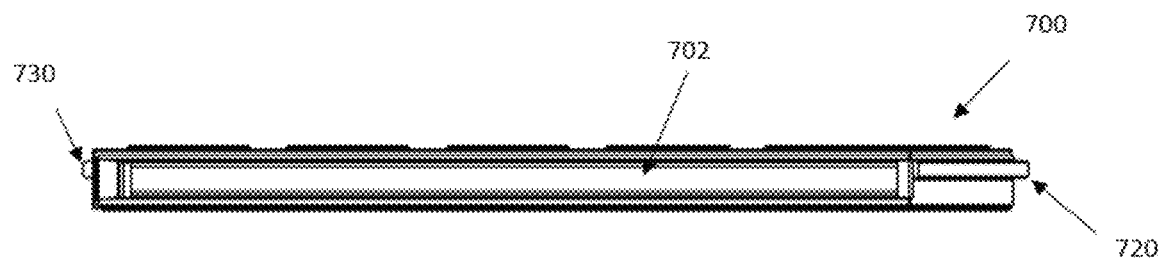
FIG. 7B is a right side view illustration of the steel battery housing, according to some embodiments.
Figures 1, 7B:
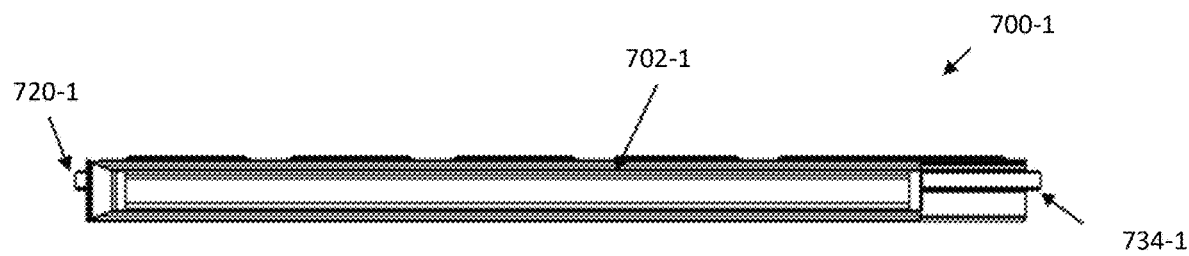
Figure 7C:
FIG. 7C is a distal side view illustration of the steel battery housing, according to some embodiments.
Figures 1, 7C:
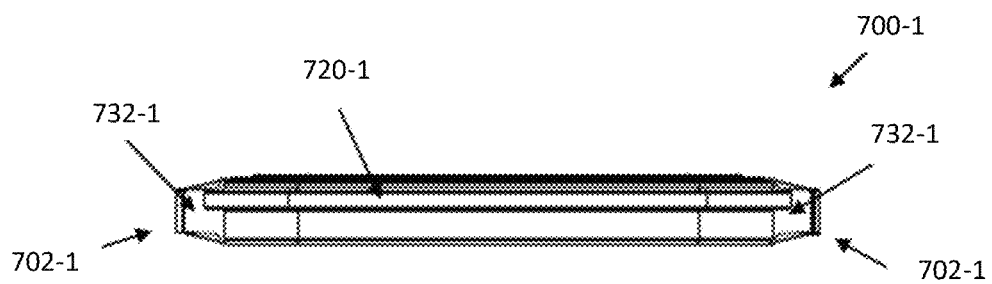
Figure 7D:
FIG. 7D is a proximal side view illustration of the steel battery housing, according to some embodiments.
Figures 1, 7D:
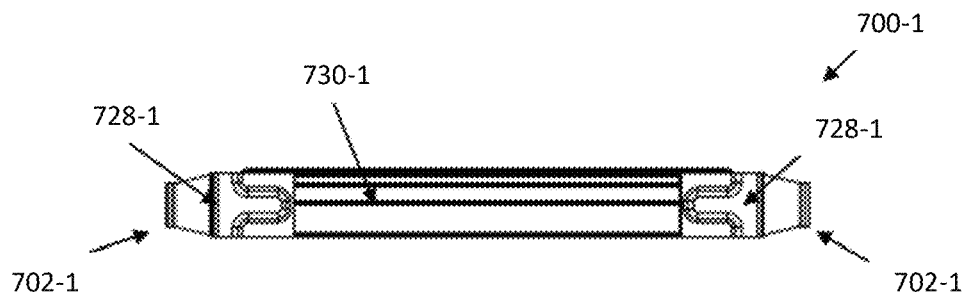

FIGS. 7A-7D show side views of a steel battery housing 700. FIG. 7A shows a left-side view of the steel battery housing 700 as shown from the +Z side of the battery housing (axis shown in FIG. 6). FIG. 7B shows a right-side view of the steel battery housing 700 as shown from the −Z side of the battery housing. A front cross member 720 is located on a distal side of the steel battery housing 700 and a primary rear cross member 730 is located on a proximal side of the steel battery housing 700. Two side crash structure 702 are shown extending between the proximal and distal sides. A length of the side crash structures 702, extending along the proximal/distal axis, is shorter than a length of the steel battery housing 700 extending along the same axis. FIG. 7C shows a distal-side view of the steel battery housing. A front cover 732 is shown attached to a front end of each side crash structure 702. FIG. 7D shows a proximal-side view of the steel battery housing. A rear cover 728 is shown attached to a rear end of each side crash structure 702. Each side crash structure 702 is shown attached to a side cross member 710. Although not shown, each rear cover 728 may be attached to a secondary rear cross member.

FIGS. 7A-1-7D-1 show side views of a steel battery housing 700-1. FIGS. 7A-1 shows a left-side view of the steel battery housing 700-1, according to some embodiments. FIGS. 7B-1 shows a right-side view of the steel battery housing 700-1, according to some embodiments. FIGS. 7C-1 shows a distal-side view of the steel battery housing 700-1, according to some embodiments. FIGS. 7D-1 shows a proximal-side view of the steel battery housing 700-1, according to some embodiments. The design of the steel battery housing 700-1 is similar to the steel battery housing 700 described above with some differences. The steel battery housing 700-1 includes side crash structures 702-1, a front cross member 720-1, a primary rear cross member 730-1, front covers 732-1, a rear cover 728-1, and two additional members 734-1.

Figure 8A:
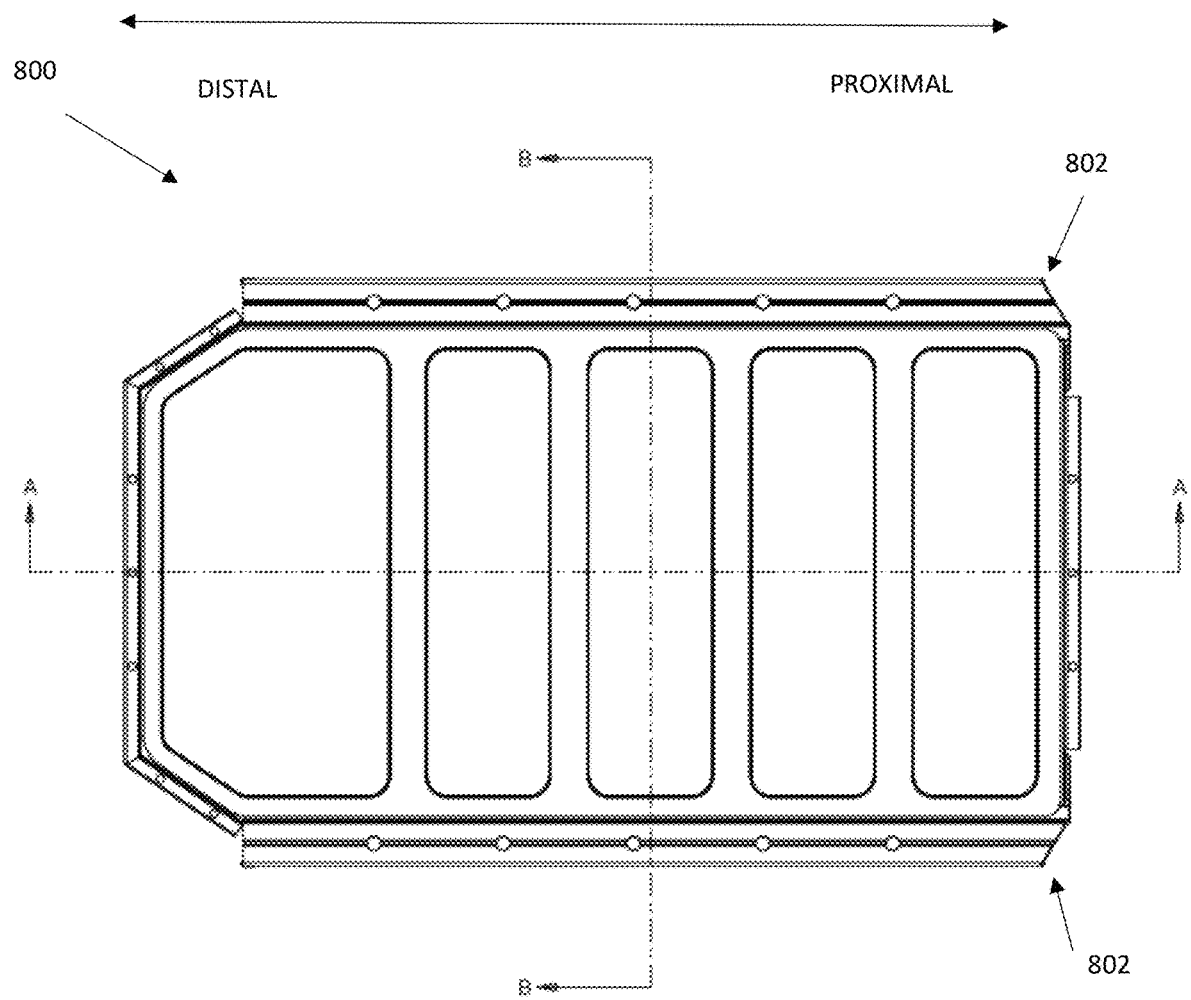
FIG. 8A is a bottom view illustration of the steel battery housing, according to some embodiments.
Figures 1, 8A:
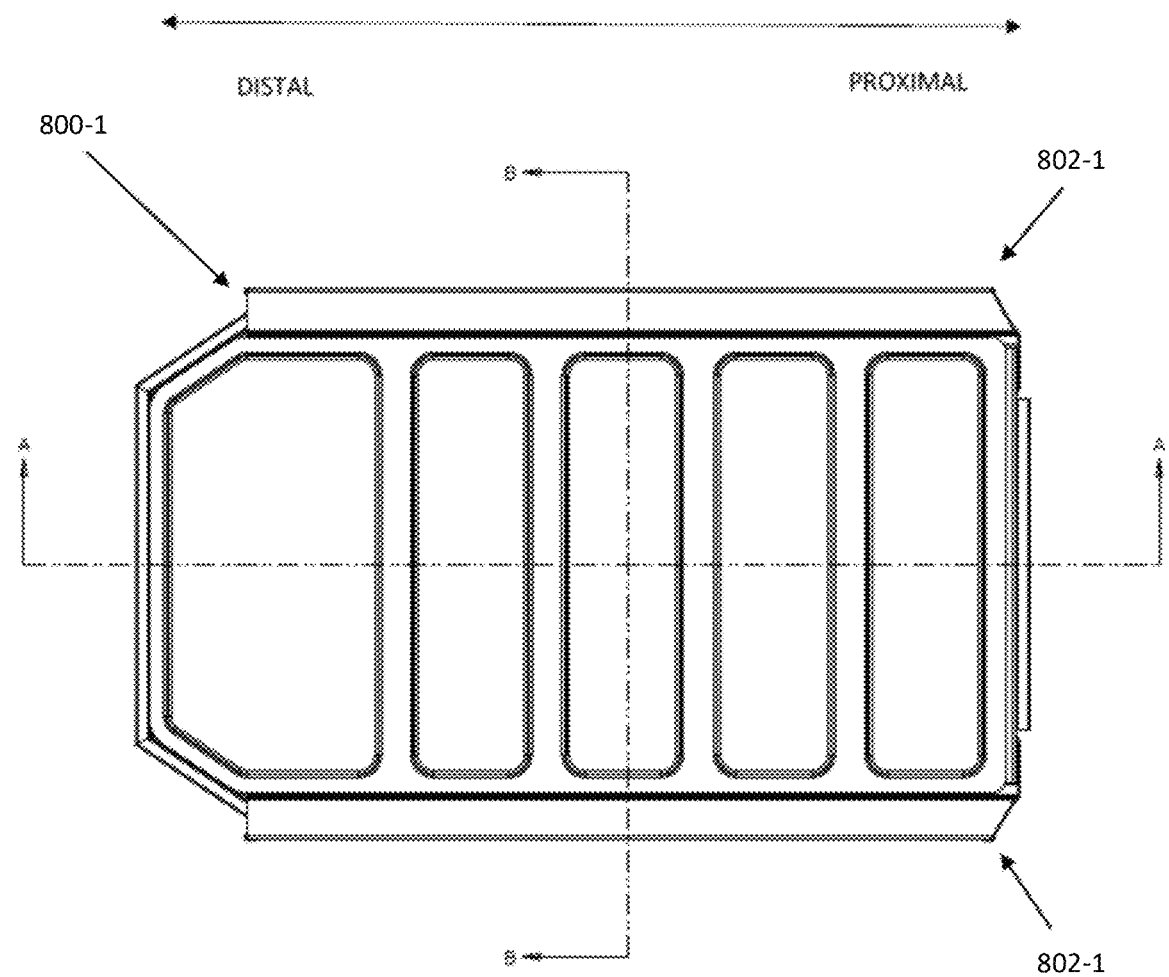
Figure 8B:
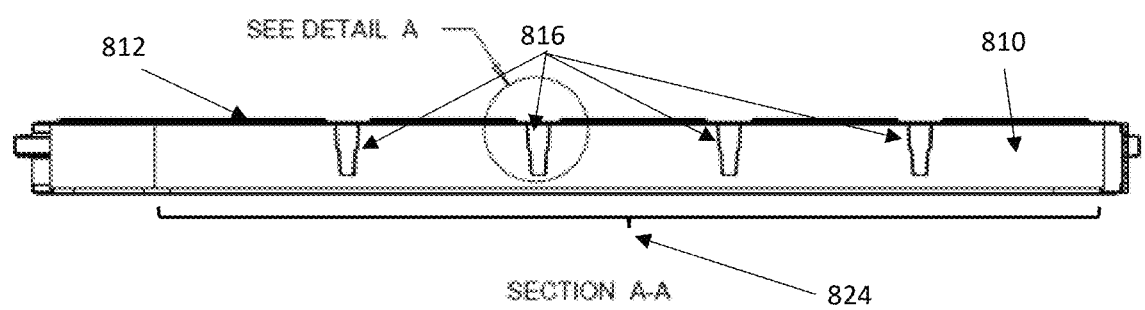
FIG. 8B is a cross sectional side view illustration of the battery housing of FIG. 8A, according to some embodiments.
Figures 1, 8B:
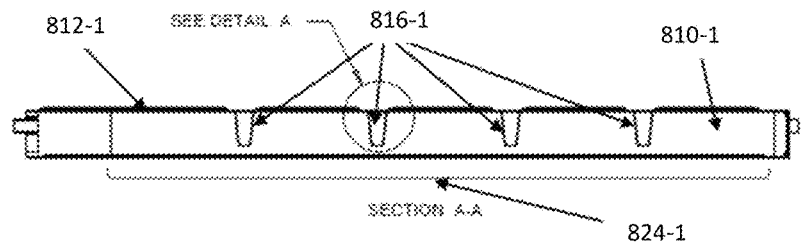

FIG. 8A is a bottom view of a steel battery housing 800, which includes section A-A and section B-B. A side crash structure 802 located on each side. A proximal end of the side crash structure 802 is tapered while a distal end is square. FIGS. 8B-8E show several cross-sectional views of the steel battery housing 800. FIG. 8B is a cross-sectional side view of section A-A of the steel battery housing 800, which includes a detail A portion of a c-profile bar 816. A battery compartment 824 configured to hold batteries or battery modules is shown. Four c-profile bars 816 are located within the battery compartment 824. Each of the four c-profile bars 816 are positioned adjacent to a lower protection cover 812. The c-profile bar 816 serve as connecting elements with both side cross members 810 and separate the battery compartment 824 into sections.

FIG. 8A-1 is a bottom view of a steel battery housing 800-1, which includes section A-A and section B-B. FIG. 8B-1 is a cross-sectional side view of section A-A of the steel battery housing 800-1, which includes a detail A portion of a c-profile bar 816-1. The design of the steel battery housing 800-1 is similar to the steel battery housing 800 described above with some differences. The steel battery housing 800-1 includes a side crash structure 802-1, a side cross member 810-1, a lower protection cover 812-1, c-profile bars 816-1, and a battery compartment 824-1. As shown, the side crash structure 802-1 does not include apertures which are depicted in FIG. 8A.

Figure 8C:
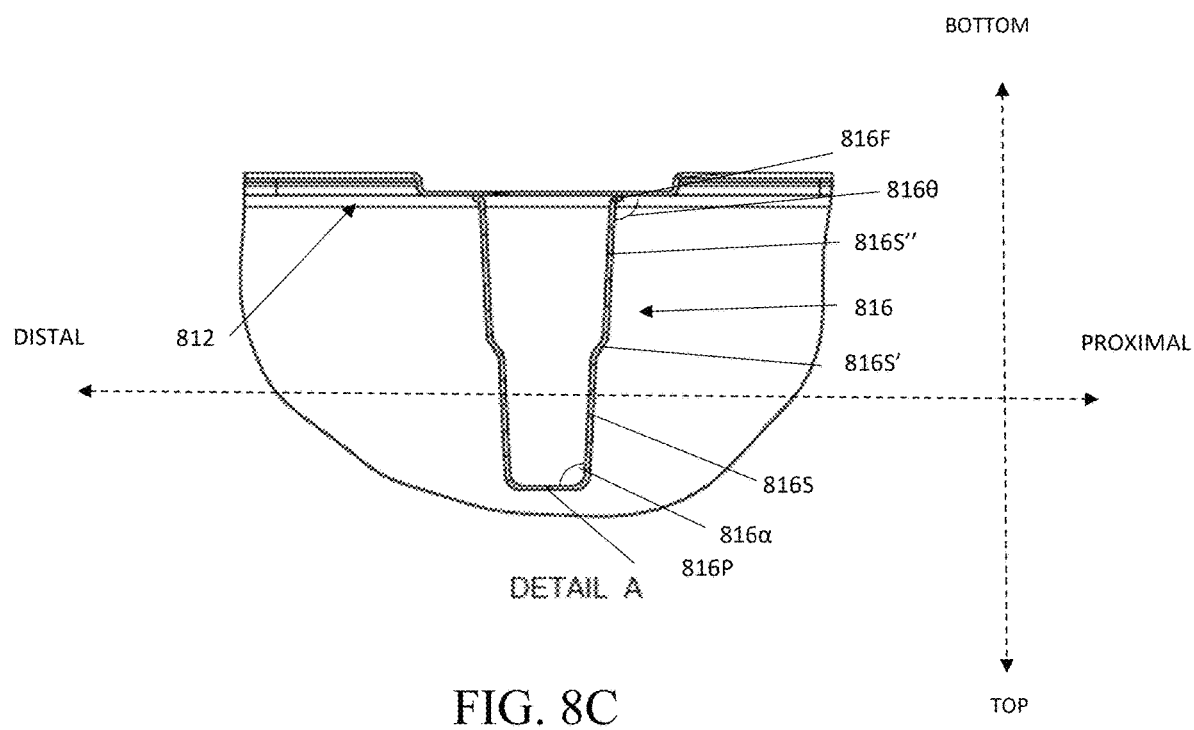
FIG. 8C is a close-up view illustration of a c-profile bar of the cross sectional side view of FIG. 8B, according to some embodiments.
Figures 1, 8C:
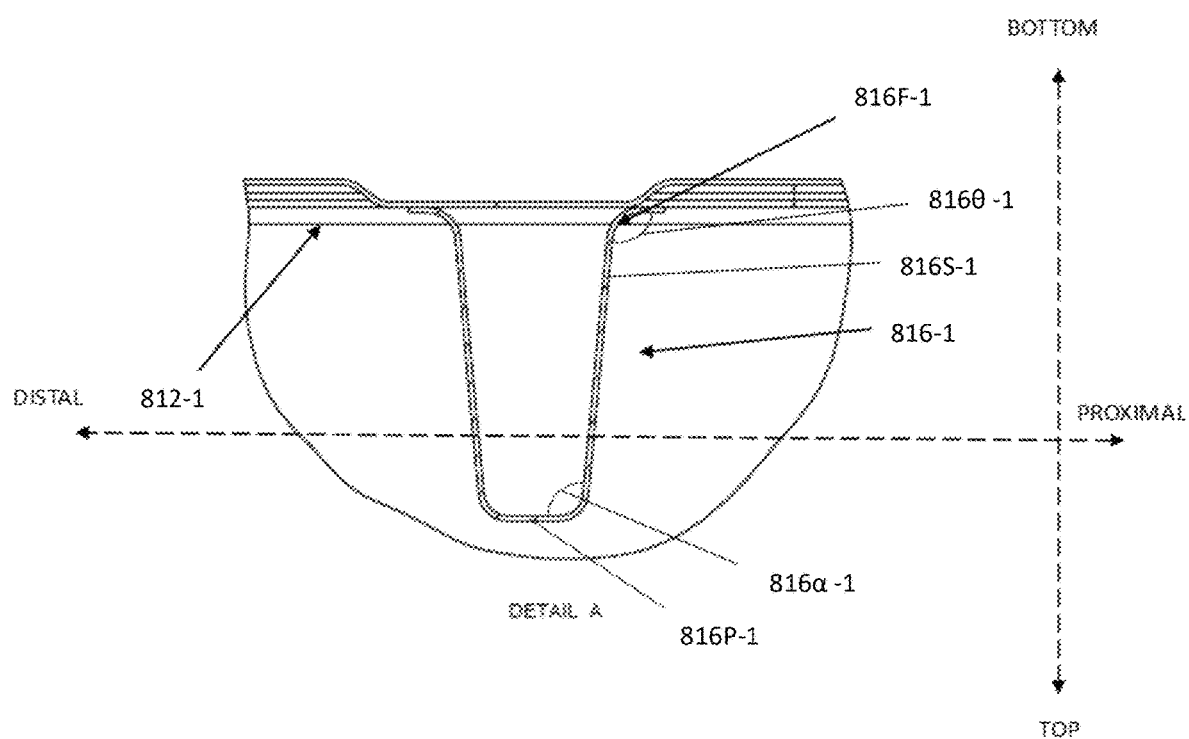

FIG. 8C is a close-up view of the c-profile bar 816 shown in detail A of FIG. 8B. The cross-section of the c-profile bar 816 includes a primary portion 816P which is oriented in a horizontal direction perpendicular to the bottom/top-axis. For purposes of describing the embodiment of this figure, "outward" describes a direction away from the primary portion and along the distal/proximal-axis, and "inwards" describes a direction towards the primary portion, and along the distal/proximal-axis. Two secondary portions 816S extend outwards from either end of the primary portion 816P toward the lower protection cover 812. A third portion 816S' extends outward from each secondary portion 816S, in a non-vertical direction, and towards the lower protection cover 812. A fourth portion 816S" extends outward from each third portion 816S' toward the lower protection cover 812. A flange portion 816F extends outward from each fourth portion 816S" in a horizontal direction. The flange portion 816F is attached to the lower protection cover 812. In some embodiments, one or both of the two secondary portions 816S is oriented vertically. In some embodiments, one or both of the two fourth portions 816S" is oriented vertically.

A first angle 816α defines the primary portion 816P relative to the two secondary portions 816S. A second angle 816θ defines the two flange portions 816F relative to the two fourth portions 816S". As shown, both angles are greater than 90 degrees. In some embodiments, the first and/or second angles (816α, 816θ) are greater than 90 degrees but less than 180 degrees. In some embodiments, the primary portion is angled such that the orientation is between vertical and horizontal.

FIG. 8C-1 is a close-up view of the c-profile bar 816-1 shown in detail A of FIG. 8B-1. The design of the c-profile bar 816-1 is similar to the c-profile 816 bar described above with some differences. The c-profile bar 816-1 includes a primary portion 816P-1, a first angle 816α, two secondary portions 816S, a second angle 816θ-1, and two flanges 816F-1. The c-profile bar 816-1 connects to a lower protection cover 812-1. The two secondary portions 816S-1 extend from the primary portion 816P-1 directly to the lower protection cover 812-1. Further, the flange portion 816F extends from the primary portion 816P-1 and along the lower protection cover 812-1 further than the flange portion of FIG. 8C.

Figure 8D:
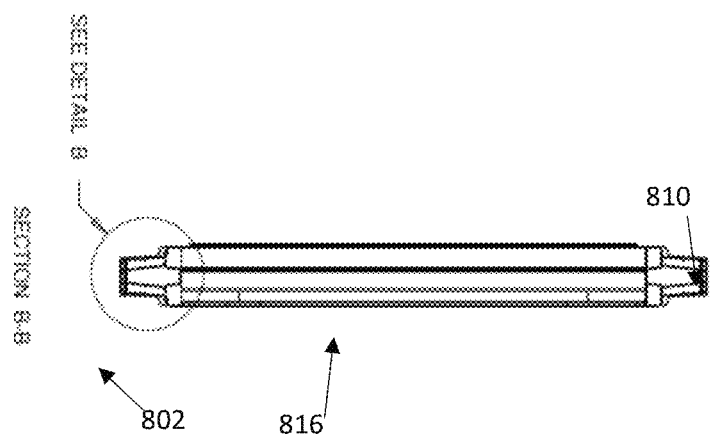
FIG. 8D is a cross sectional distal side view illustration of the battery housing of FIG. 8A, according to some embodiments.
Figures 1, 8D:
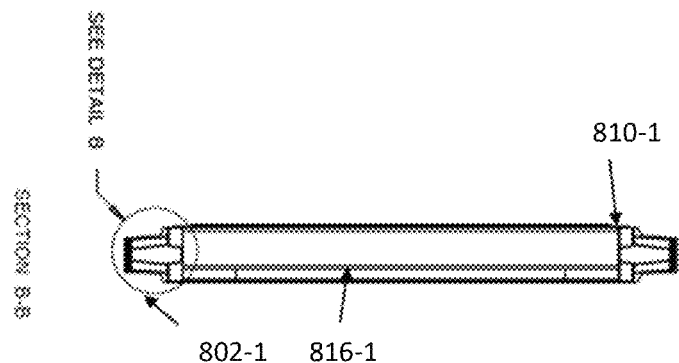

FIG. 8D is a cross-sectional distal-side view of section B-B of the battery housing 800, which includes a detail B portion of a side crash structure 802. As shown in FIG. 8D, c-profile bar 816 extends horizontally and is positioned between two side cross members 810. A side crash structure 802 is attached to each side cross member 810.

FIG. 8D-1 is a cross-sectional distal-side view of section B-B of the battery housing 800-1, which includes a detail B portion of a side crash structure 802-1. The design of the side crash structure 802-1 is similar to the side crash structure 802 described above with some differences. The battery housing includes the side crash structure 802-1, c-profile bar 816-1, and the side cross member 810-1.

Figure 8E:
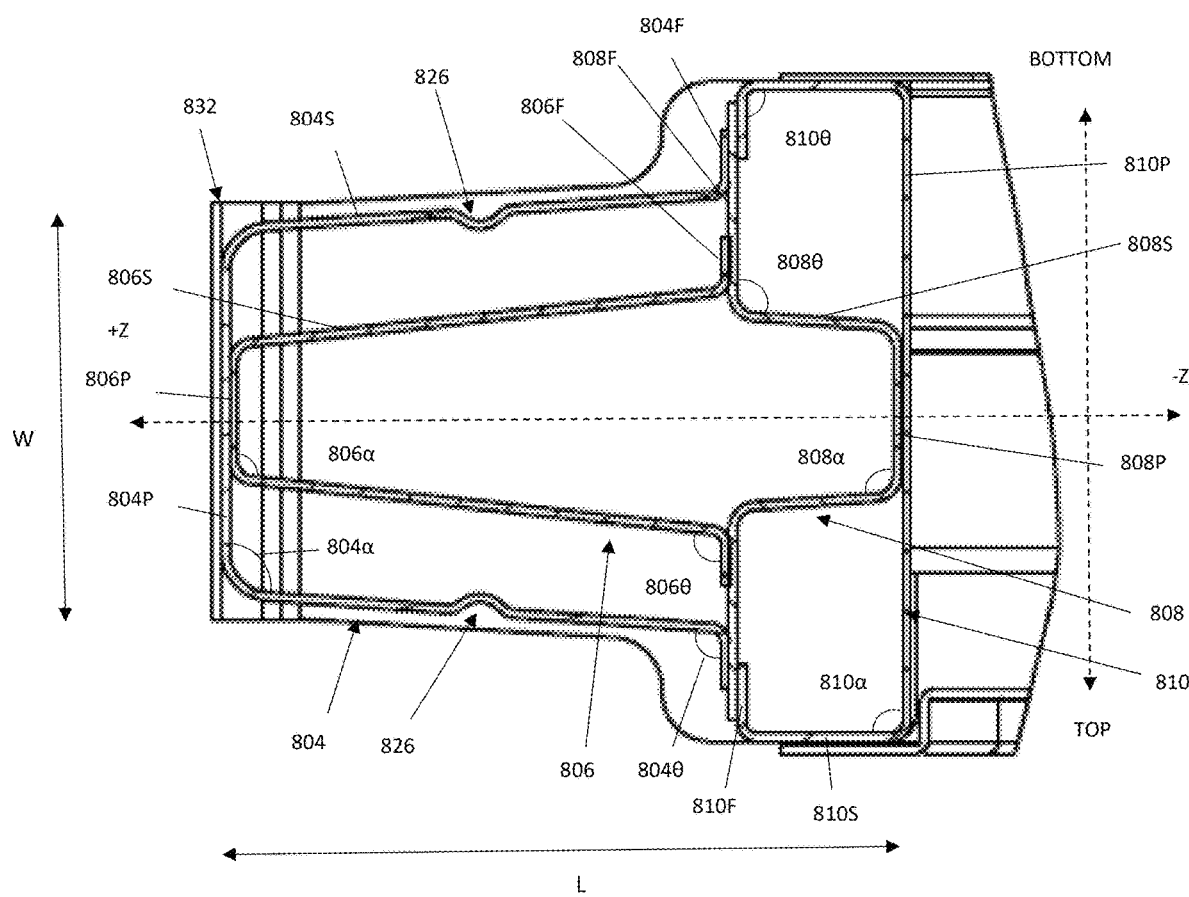
FIG. 8E is a close-up view illustration of a side crash structure of the cross sectional distal view of FIG. 8D, according to some embodiments.
Figures 1, 8E:
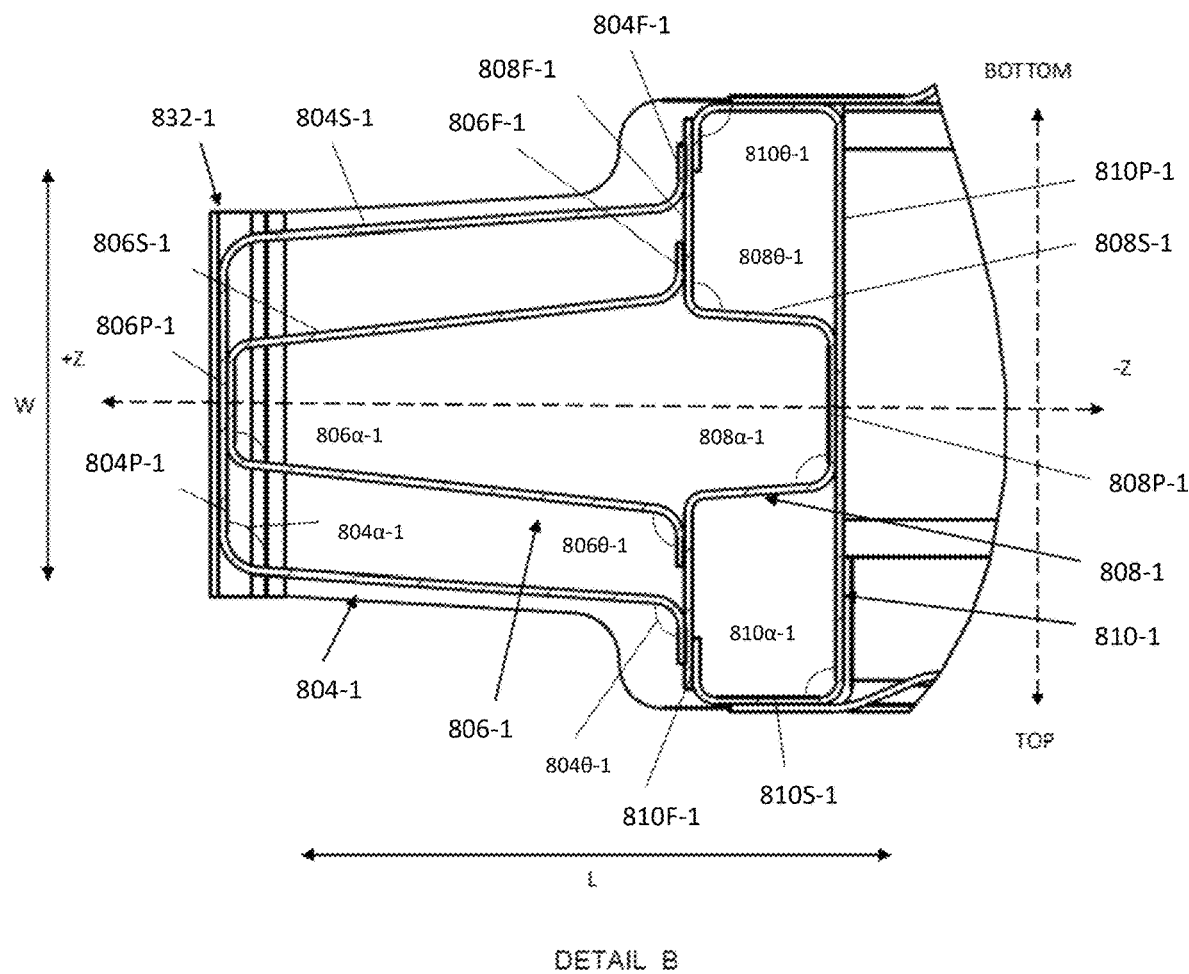

FIG. 8E is a close-up view of a side crash structure 802 of detail B in FIG. 8D, and shows the cross section of the side crash structure 802. The side crash structure 802 includes an omega plate 808, a trapeze plate 806, a c-profile plate 804, a front cover 832, and a rear cover 828 (not shown). The side crash structure 802 is attached to the side cross member 810.

For the purposes of the embodiment in this figure, an z-axis bisects the side crash structure 802 into an upper and lower portion. "Vertical" is used to describe an orientation perpendicular to the z-axis while "horizontal" is used to define a direction parallel with the z-axis. In some embodiments, the upper portion is symmetrical with the lower portion. In some embodiments the portions are asymmetrical. The term "inwards" is used to describe a direction that is towards the z-axis and the term "outwards" describes a direction away from the z-axis. Likewise, "inwards" is used to describe a direction towards a battery compartment, or in the −z direction, while "outwards" describes a direction away from the battery compartment, or in a +z direction.

FIG. 8E shows a cross sectional view of the plate components of the side crash structure 802 and the side cross member 810. Each includes a primary portion, denoted with a P, which transitions to two secondary portions, denoted with an S, each secondary portion transitions to a flange, denoted F. Further, a first angle, α, is the angle between the primary portion and each secondary portion, and a second angle, θ, is the angle between each secondary portion and each flange. Each primary portion is orientated perpendicular to the z-axis. In some embodiments, one or more of the primary portions is not oriented perpendicular to the z-axis. Further, each flange portion is oriented perpendicularly to the z-axis. In some embodiments, one or more of the flange portions is not oriented perpendicular to the z-axis The cross section of the side cross member 810 resembles a c-channel with end flanges angled inwards. As shown, a primary portion 810P is orientated vertically. Two secondary portions 810S extend horizontally from the primary portion 810P at a first angle 810α. The first angle 810α is 90 degrees such that the two secondary portions 810S extend in an outwards direction. Two flanges 810F extend inward from the secondary portions 810S at a second angle 810θ. The second angle 810θ is 90 degrees such that the two flanges 810F extend toward the z-axis. As shown, the flanges 810F are oriented vertically. In some embodiments, the first and/or second angle (810α, 810θ) is less than or greater than 90 degrees, for instance 86°, 94°. In some embodiments, one and/or both of the secondary portions 810S are not orientated horizontally.

The cross section of the omega plate 808 resembles an omega shape. A primary portion 808P of the omega plate 808 is oriented vertically. Two secondary portions 808S extend in an outward direction from the primary portion 808P at a first angle 808α. As shown, the first angle 808α is greater than 90 degrees. Two flanges 808F extend outwards vertically from the secondary portions 808S at a second angle 808θ. As shown, the second angle 808θ is greater than 90 degrees. In some embodiments, the first and/or second angle (808α, 808θ) is less than 180 degrees but greater than 90 degrees. In some embodiments, the first and/or second angle (808α, 808θ) is less than or greater than 90 degrees, e.g. 86°, 90°, 94°. In some embodiments, one or both of the two secondary portions 808S are oriented horizontally.

The cross section of the trapeze plate 806 resembles a trapezoid with end flanges angled outwards. A primary portion 806P of the trapeze plate 806 is oriented vertically. Two secondary portions 806S extend from the primary portion at a first angle 806α. The first angle 806α is greater than 90 degrees and the two secondary portions 806S extend in an inwards direction. Two flanges 806F extend outwards from the secondary portions 806S at an angle greater than 90 degrees. As shown, the flanges 806F are orientated vertically. In some embodiments, the first and/or second angle (806α, 808θ) is less than or equal to 90 degrees, e.g. 91°, 93°, 95°. In some embodiments, the flanges 806F are not oriented vertically. In some embodiments, the cross section of the trapeze plate 806 resembles a c-channel.

The cross section of the c-profile plate 804 resembles a c-channel with end flanges angled outwards. A primary portion 804P of the c-profile plate 804 is orientated vertically. Two secondary portions 804S extend in an inwards direction from the primary portion at a first angle 804α. As shown, the first angle 804α is greater than 90 degrees, e.g. 91°, 95°, 100°. Two flanges 804F extend outwards from the secondary portions 804S at a second angle 804θ. As shown, the second angle 804θ is greater than 90 degrees, e.g. 91°, 95°, 100° and the flanges 804F are oriented vertically. In some embodiments, one and/or both of the secondary portions 804S are orientated horizontally. In some embodiments, the first and second angle (804α, 804θ) is less than 180 degrees but greater than 90 degrees, e.g. 110°, 120°, 130°. Each secondary portion 804S has a beat 826 that faces outward. In some embodiments, the beat 826 faces inwards. The beat 826 of the lower secondary portion is vertically aligned with the beat of the upper secondary portion. The beats 826 help direct deformation during an impact event and increase deformation resistance of the c-profile plate 804.

In an assembled state, an inside surface of the primary portion 808P of the omega plate 808 is attached to an outside surface of the primary portion 810P of the side cross member 810. An inside surface of the flanges 808F of the omega plate 808 is attached to an outside surface of the flanges 810F of the side cross member 810. The c-profile plate 804 is positioned such that an inside surface of the flanges 804F of the c-profile plate 804 is attached to an outside surface of the flanges 808F of the omega plate 808. The trapeze plate 806 is positioned such that an inside surface of the flanges 806F of the trapeze plate 806 is attached to the outside surface of the flanges 808F of the omega plate 808. An outside surface of the primary portion 806P of the trapeze plate 806 is attached to an inside surface of the primary portion 804P of the c-profile plate 804. The front cover 832 attaches to the distal end of the side crash structure 802 while the rear cover 828 attaches to the proximal end.

FIG. 8E-1 is a close-up view of a side crash structure 802-1 of detail B in FIG. 8D-1, and shows the cross section of the side crash structure 802-1. The design is similar to the side crash structure 802 described above with some differences. The side crash structure 802-1 includes a c-profile plate 804-1, a trapeze plate 806-1, a omega plate 808-1. The side crash structure 802-1 is attached to a side cross member 810-1. Each component includes a primary portion (804P-1, 806P-1, 808P-1, 810P-1), secondary portions (804S-1, 806S-1, 808S-1, 810S-1), first and second angles (804α-1, 804θ-1, 806α-1, 806θ-1, 808α-1, 808θ-1, 810α-1, 810θ-1) and flanges (804F-1, 806F-1, 808F-1, 810F-1). Notably, the c-profile plate 804-1 does not include beats (e.g. 826) along the secondary portions as described in FIG. 8E.

Figure 9:
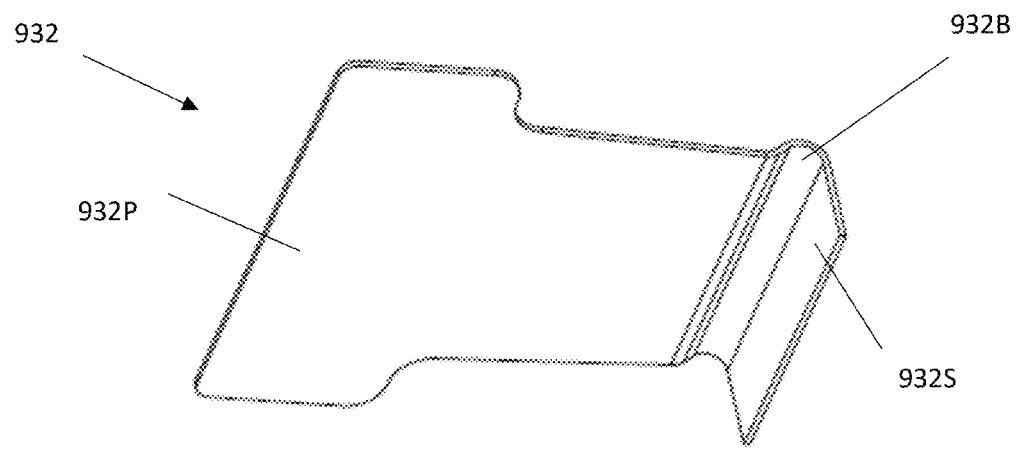
FIG. 9 is a perspective view illustration of a front cover of the side crash structure, according to some embodiments.

FIG. 9 is a perspective view illustration of a front cover 932 of the side crash structure. The front cover 932 comprises a primary portion 932P resembling a flat plate. The primary portion 932P includes a wide rectangular portion and a tapered rectangular portion. An offset bend 932B extends from the tapered portion, and a secondary portion 932S extends from the offset bend 932B in a direction perpendicular to the primary portion 932P. The secondary portion 932S is rectangular in shape. In some embodiments, the front cover 932 comprises a single piece of sheet metal which has been bent into the described shape. When assembled, the 932P is positioned adjacent to a distal end of the omega, trapeze, and c-profile plates, and the side cross member. The offset bend 932B accommodates the distal end of the c-profile plate, while the secondary portion 932S abuts a top surface of the c-profile plate.

Figure 10:
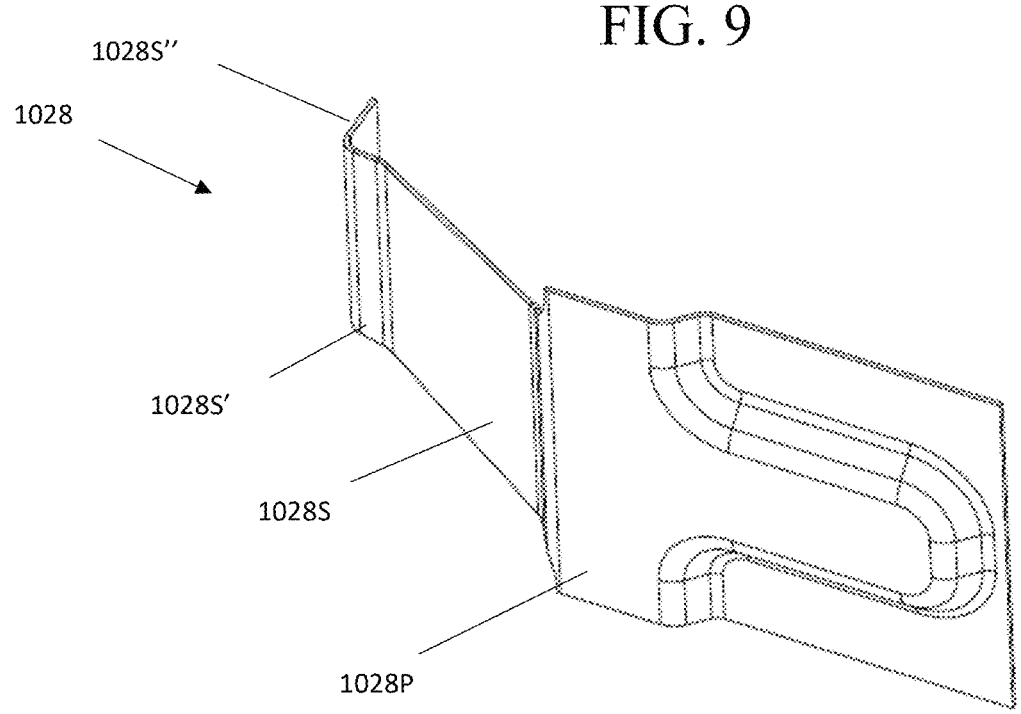
FIG. 10 is a perspective view illustration of a rear cover of the side crash structure, according to some embodiments.
Figures 1, 10:
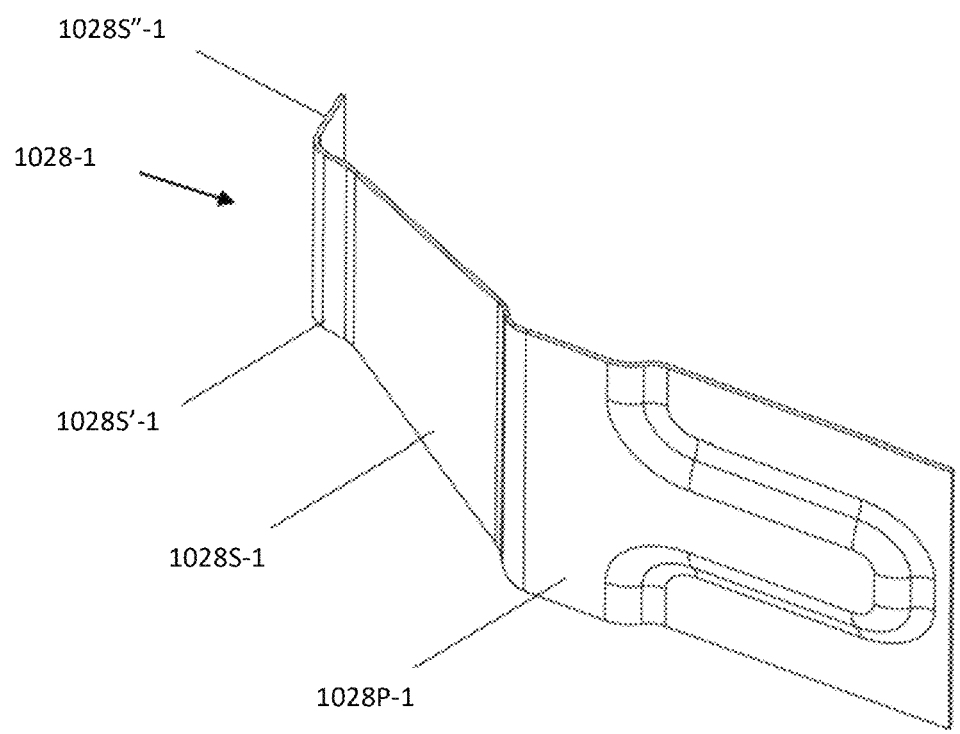
Figure 11A:
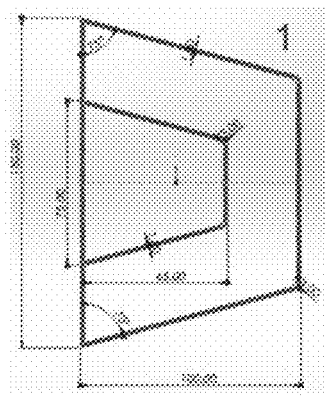
FIG. 11A is an image of a cross section simulation of a side crash structure, according to some embodiments.
Figure 11B:
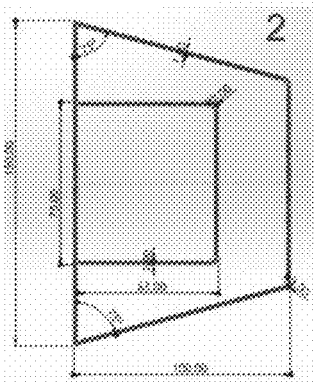
FIG. 11B is an image of a cross section simulation of a side crash structure, according to some embodiments.
Figure 11C:
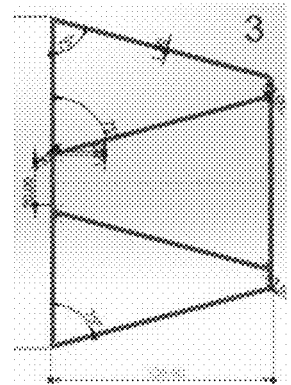
FIG. 11C is an image of a cross section simulation of a side crash structure, according to some embodiments.
Figure 11D:
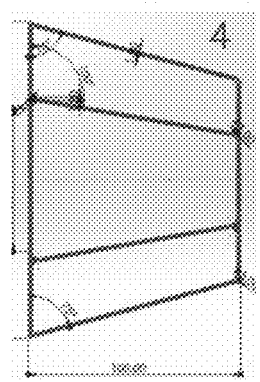
FIG. 11D is an image of a cross section simulation of a side crash structure, according to some embodiments.
Figure 11E:
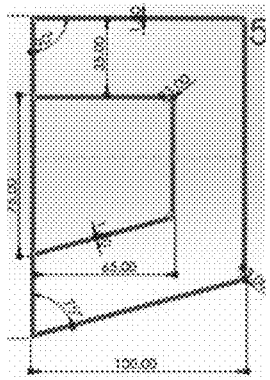
FIG. 11E is an image of a cross section simulation of a side crash structure, according to some embodiments.
Figure 11F:
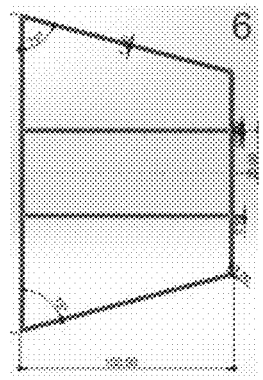
FIG. 11F is an image of a cross section simulation of a side crash structure, according to some embodiments.

FIG. 10 is a perspective view illustration of a rear cover 1028 of the side crash structure. The rear cover 1028 comprises a primary portion 1028P, a secondary portion 1028S extending therefrom, a third portion 1028S' extending from the secondary portion 1028S, and a fourth portion 1028S" extending from the fourth portion 1028S". The primary portion 1028P has a uniform width and is rectangular in shape. The secondary portion 1028S bends inward from the primary portion 1028P and has a tapered width. The third portion 1028S' bends outward from the secondary portion 1028S and has a uniform width with a rectangular shape. The fourth portion 1028S" bends inward from the third portion 1028S' and has a uniform width with a rectangular shape. The primary portion 1028P comprises a upper portion with a T-shape and a lower portion which surrounds the upper portion. When assembled, the 1028P is positioned adjacent to the primary rear cross member. The secondary portion 1028S and third portion 1028S' abut a tapered end of the plates of the side crash structure. The fourth portion 1028S" abuts the top surface of the c-profile plate.

FIG. 10-1 is a perspective view illustration of a rear cover 1028-1 of the side crash structure. The design is similar to the rear cover described in FIG. 10 with slight differences. The rear cover 1028-1 includes a primary portion 1028P-1, a secondary portion 1028S-1, a third portion 1028S'-1, and a fourth portion 1028S"-1. The tapered width of the secondary portion 1028S-1 is gradual and uniform compared to the tapered width of FIG. 10. Further, the upper shaped T-portion of the primary portion 1028P-1 is less prominent.

As an example of an embodiment of any one of FIGS. 6-10, the battery housing includes the following dimensions and design specifications: The lower protection cover 612 has a thickness of 1.2 mm to 2.2 mm (e.g., 1.3 mm, 1.5 mm, 1.8 mm). The upper protection cover 622 has a thickness of 1.2 mm to 2.2 mm (e.g., 1.3 mm, 1.5 mm, 1.8 mm). The secondary rear cross member 614 has a thickness of 1.2 mm to 2.2 mm (e.g., 1.3 mm, 1.5 mm, 1.8 mm) and inner bend radii of 1.2 to 3.2 mm (e.g., 1.5 mm, 2.2 mm, 2.8 mm). The two side cross members 610 have a thickness of 1.2 mm to 2.2 mm (e.g., 1.3 mm, 1.5 mm, 1.8 mm) and inner bend radii of 1.2 to 4.5 mm (e.g., 2.2 mm, 3.2 mm, 4.2 mm). The front plate 618 has a has a thickness of 1.2 mm to 2.2 mm (e.g., 1.3 mm, 1.5 mm, 1.8 mm) and inner bend radii of 1.2 mm to 4.5 mm (e.g., 1.5 mm, 2.2 mm, 2.8 mm, 3.2 mm, 4.2 mm). The front cross member 620 has a thickness of 1.2 mm to 2.2 mm (e.g., 1.3 mm, 1.6 mm, 1.8 mm) and inner bend radii of 2 mm to 4 mm (e.g., 2.1 mm 3.1 mm, 3.6 mm). The omega plate 608 has a thickness of 1.2 mm to 2.2 mm (e.g., 1.3 mm, 1.5 mm, 1.8 mm) and inner bend radii of 3 mm to 5 mm (e.g., 3.2 mm, 4 mm, 4.9 mm). The trapeze plate 606 has a thickness of 1.2 mm to 2.2 mm (e.g., 1.8 mm) and inner bend radii of 2 mm to 5 mm (e.g., 2.3 mm, 3 mm, 4.2 mm). The c-profile plate 604 has a thickness of 1.2 mm to 2.2 mm (e.g., 1.3 mm, 1.5 mm, 1.8 mm) and inner bend radii of 8 mm to 10 mm (e.g., 8.2 mm, 9.1 mm, 9.8 mm). The four c-profile bars 616 have a thickness of 1.2 mm to 2.2 mm (e.g., 1.3 mm, 1.5 mm, 1.8 mm) and inner bend radii of 3 mm to 8.5 mm (e.g., 4.1 mm, 5 mm, 8.2 mm). The rear cover 628 has a thickness of 1.2 mm to 2.2 mm (e.g., 1.3 mm, 1.5 mm, 1.8 mm) and inner bend radii of 5 mm to 7 mm (e.g., 5.5 mm, 6 mm, 6.5 mm). The front cover 632 has a thickness of 1.2 mm to 2.2 mm (e.g., 1.3 mm, 1.5 mm, 1.8 mm) and inner bend radii of 4.9 mm to 7 mm (e.g., 4.92 mm, 5 mm, 6 mm). The primary rear cross member 630 has a thickness of 1.2 mm to 2.2 mm (e.g., 1.3 mm, 1.5 mm, 1.8 mm) and an internal bend radii of 2 mm to 4 mm (e.g., 3.1 mm). Further, the lower protection cover 612 is comprised of HR-HSLA-420LA steel alloy sheet metal and is attached to one or more of components of the internal crash structure via arc welding and/or resistance spot welding. The upper protection cover 622 is comprised of HSLA steel sheet metal of up to 550 Mpa YS and is attached to one or more components of the internal crash structure via fasteners. The internal crash structure is comprised of AHSS steel sheet metal of up to 1200 Mpa ultimate tensile strength (UTS) and the components of the internal crash structure are attached via arc welding and/or spot welding. The side crash structure 602 is comprised of AHSS steel sheet metal of up to 980 Mpa UTS and the components of the side crash structure are attached via arc welding an/or spot welding. The four c-profile bars 616 and/or the secondary rear cross member 614 of the internal crash structure may be comprised of the same steel as the side crash structure 602.

In some embodiments, the steel battery housing (e.g. lower protection cover, upper protection cover, side crash structure, and internal crash structure) and/or the individual components thereof may be attached to each other by a variety of methods. For example, in some embodiments an attachment may include a weld (e.g., by arc welding spot welding), a fastener (e.g., bolt, screw, clip), an adhesive, an interference fit (i.e., friction fit), and combinations thereof.

In some embodiments, the material of at least some of the components (e.g., lower protection cover, upper protection cover, rear cross member, side cross member, front plate, front cross member, omega plate, trapeze plate, c-plate, c profile bar, rear cover, primary rear cross member, front cover) of the steel battery housing comprise a steel. In some embodiments, the steel is a steel sheet metal. In some embodiments, the steel comprises a high elastic limit. In some embodiments, the steel is selected from low allow steels (HSLA), advanced high-strength steel (AHSS), and ultra-high-strength steels (UHSS). In some embodiments, the steel is stamped, extruded, cast, or forged. Some examples of AHSS steels include double phase/double phase of high ductility (DP/DH) steel, transformation induced by plasticity (TRIP) steel, twinning induced by plasticity (TWIP) steel, and complex phase/high ductility complex phase (CP/CH) steel. In some embodiments, the steel alloy has a yield strength of, of about, of at least, or of at least about 180 MPa, 200 MPa, 210 MPa, 250 MPa, 280 MPa, 300 MPa, 350 MPa, 380 MPa, 400 MPa, 450 MPa, 480 MPa, 500 MPa, 450 MPa, 500 MPa, 550 MPa, 600 MPa, 650 MPa, 700 MPa, 750 MPa, 800 MPa, 850 MPa, 900 MPa, 950 MPa, 980 MPa, 1000 MPa, 1050 MPa, 1100 MPa, 1150 MPa, 1180 MPa, 1200 MPa, 1300 MPa, 1400 MPa, 1500 MPa or 2000 MPa, or any range of values therebetween.

In some embodiments, the steel, such as steel sheet metal, has a thickness of, of about, of at most, or of at most about, 0.5 mm, 0.75 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.75 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, and 10 mm or any range of values therebetween. In some embodiments, a component (e.g., omega plate, trapeze plate, c-profile plate) of the steel battery housing has inner bend radii of, of about, of at least, or of at least about, 1.8 mm, 1.9 mm, 2 mm, 2.1 mm, 2.2 mm, 2.3 mm, 2.4 mm, 2.5 mm, 2.75 mm, 3 mm, 3.1 mm, 3.5 mm, 4 mm, 4.2 mm, 4.5 mm, 4.9 mm, 4.92 mm, 5 mm, 5.4 mm, 5.5 mm, 6 mm, 6.5 mm, 7 mm, 7.5 mm, 8 mm, 8.2 mm, 8.5 mm, 9 mm, 9.1 mm, 9.2 mm; 9.3 mm, 9.5 mm or 10 mm, or any range of values therebetween. In some embodiments, a vertical width W of a primary portion of the c-profile plate is, is about, is at least, or is at least about, 40 mm, 45 mm, 50 mm, 55 mm, 60 mm, 65 mm, 70 mm, 75 mm, 80 mm, 85 mm, 90 mm, 95 mm, 98 mm, 100 mm, 110 mm, 120 mm, 124 mm, 130 mm, 140 mm, 150 mm, 160 mm, 170 mm, 180 mm, 190 mm, 200 mm or 250 mm, or any range of values therebetween. In some embodiments, a combined horizontal length L of a side crash structure and side cross member is, is about, is at least, or is at least about, 100 mm, 110 mm, 120 mm, 130 mm, 140 mm, 150 mm, 152 mm, 160 mm, 170 mm, 180 mm, 190 mm, 200 mm, 250 mm or 250 mm, or any range of values therebetween.

In some embodiments, the side crash structure is configured to absorb energy from a collision while also retaining the rigidity of the steel battery housing. In some embodiments, the components of the side crash structure are configured to deform and distribute energy upon impact with an object (e.g., vehicle, pole, animal).

EXAMPLES

Example embodiments of the present disclosure, including architectures, processes, materials and/or resultant products, are described in the following examples.

Example 1

FIGS. 11A-11F show cross section simulations of a side crash structures geometries 1-6, respectively, according to some embodiments. The cross section simulations shown are modified versions of the crash structure of FIGS. 4E and 8E. Experimentation was done on these cross section simulations to determine the applicability of such geometries to side crash structures, including by measuring moment of inertia, weight, and impact absorption of each structure.

Figure 12A:
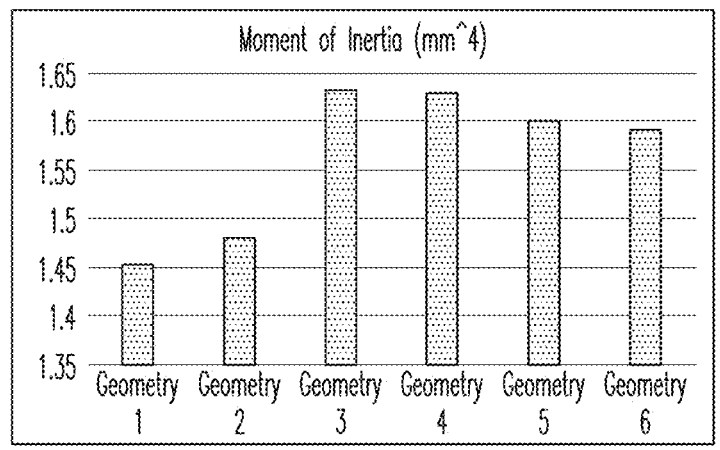
FIG. 12A is a bar chart of moment of inertial data for various simulated crash structures, according to some embodiments.
Figure 12B:
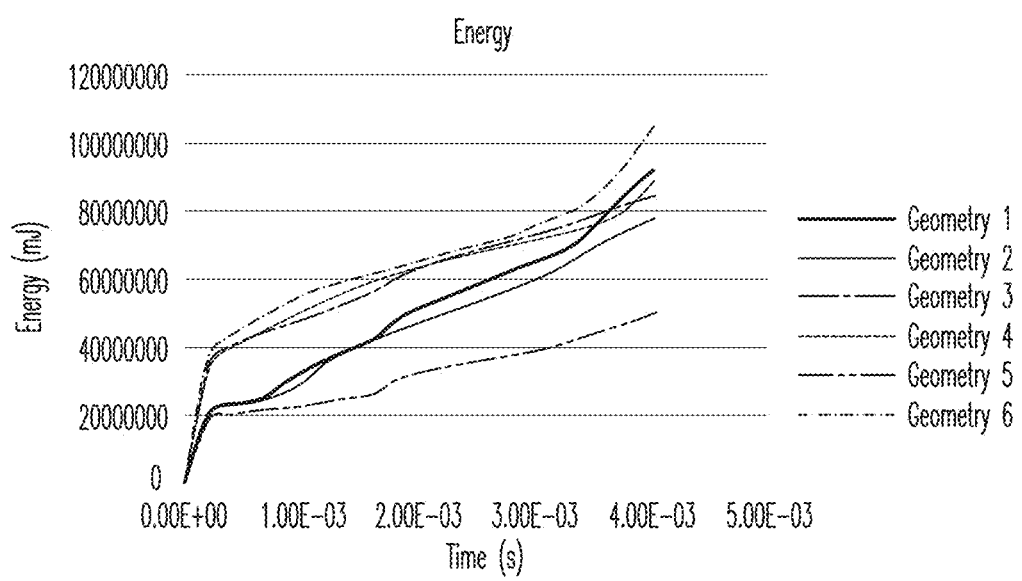
FIG. 12B is a line graph of energy vs. time data for various simulated crash structures, according to some embodiments.
Figure 12C:
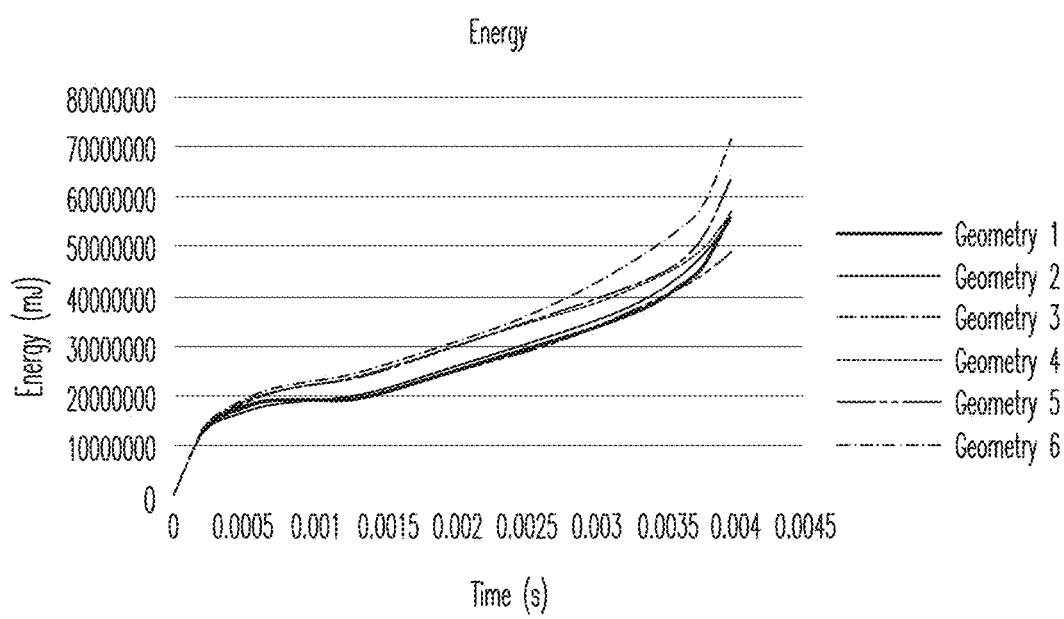
FIG. 12C is a line graph of energy vs. time data for various simulated crash structures, according to some embodiments.

FIGS. 12A-12C show simulated experimental data associated with the cross section simulations of geometries 1-6 shown in FIGS. 11A-11F. FIG. 12A is a bar chart of moment of inertia data for each of the geometries 1-6. As a result of testing and calculation, it was determined that geometry 1 has the lowest moment of inertia while geometry 3 has the highest moment of inertia. FIG. 12B is a line graph of energy vs. time data for each of the geometries 1-6 recorded during a side impact test. Based on the testing it was determined that geometry 5 absorbed the least amount of energy and geometry 6 absorbed the highest amount of energy. FIG. 12C is a line graph of energy vs. time data for each of the geometries 1-6 recorded during a side impact test with a pole. Based on the testing it was determined that geometry 5 absorbed the least amount of energy and geometry 6 absorbed the highest amount of energy.

Example 2

Figure 13A:
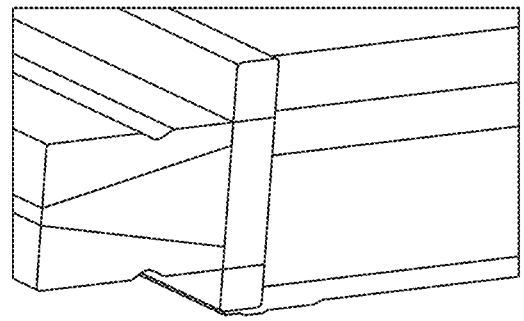
FIG. 13A is a perspective view illustration of a cross section of the side crash structure, according to some embodiments.
Figure 13B:
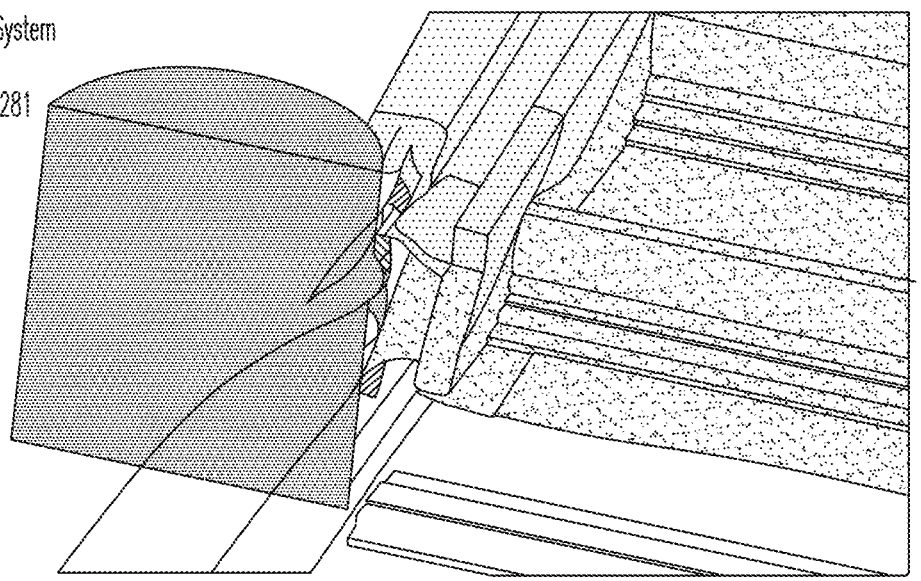
FIG. 13B is the results of a deformation simulation of a cross section of the side crash structure, according to some embodiments.

FIG. 13A is a perspective view illustration of a simulated cross section of a side crash structure, according to some embodiments. Here, the side crash structure includes beats. FIG. 13B shows the results of a deformation simulation of the side crash structure of FIG. 13A during impact with a pole. The results of this experiment showed that the pole offset the crash structure by 80 mm and that the resulting intrusion to the battery housing was 18 mm.

Example 3

Figure 14A:
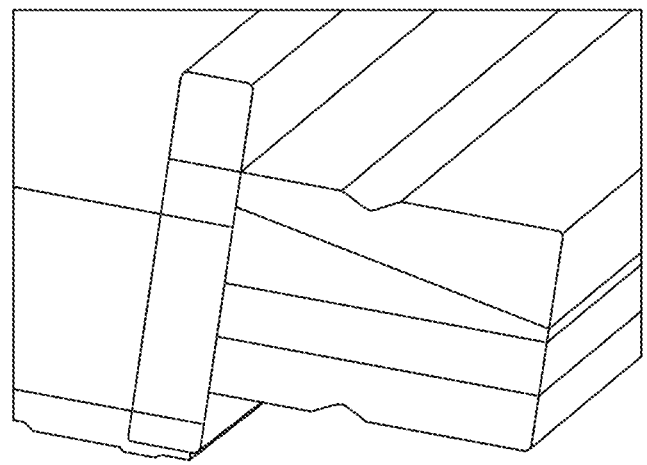
FIG. 14A is a perspective view illustration of a cross section of the side crash structure, according to some embodiments.
Figure 14B:
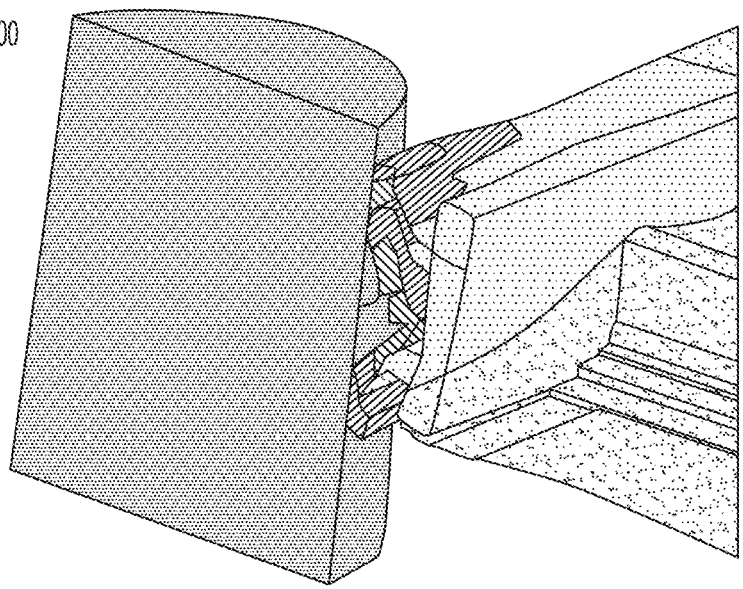
FIG. 14B is the results of a deformation simulation of a cross section of the side crash structure, according to some embodiments.

FIG. 14A is a perspective view illustration of a simulated cross section of a side crash structure, according to some embodiments. Here, the cross section is nonsymmetrical and includes beats. FIG. 14B shows the results of a deformation simulation of the side crash structure of FIG. 14A during impact with a pole. The results of this experiment showed that the pole offset the crash structure by 80 mm and that the resulting intrusion to the battery housing was 13.8 mm. This simulation was performed using a simulation of a plain ICE Sedan frame with the battery housing.

Example 4

Figures 15A, 15B:
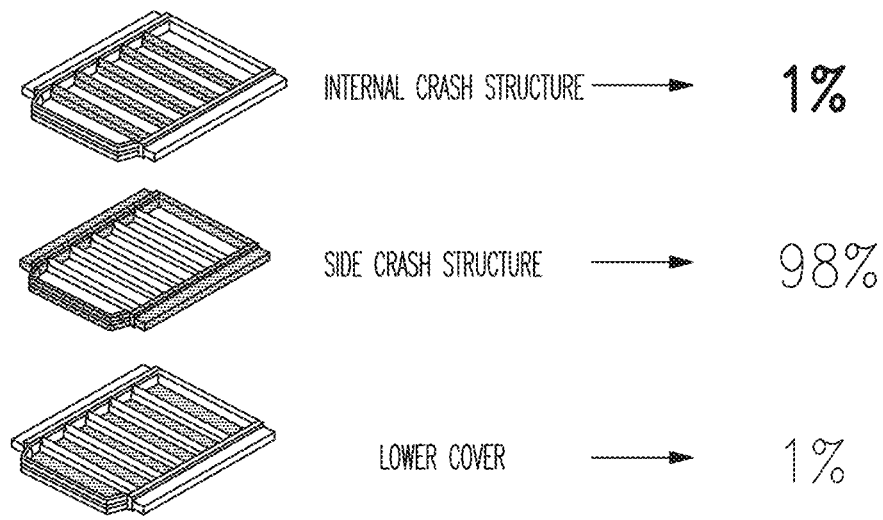
FIG. 15A shows the impact absorption of several components of the battery housing, according to some embodiments.
FIG. 15B shows the impact absorption of several components of the battery housing, according to some embodiments.

FIG. 15A shows the impact absorption of several components of a battery housing that includes a side crash structure according to FIGS. 4A-4E and 8A-8E, according to some embodiments. Accordingly, upon an impact event 98% of the energy is absorbed by the following components: side crash structures, side cross members, primary rear cross member, secondary rear cross member, front plate, and front cross member. Further, 1% of the energy was shown to be absorbed by c-profile bars. Another 1% was shown to be absorbed by a lower protection cover.

FIG. 15B shows the impact absorption of several specific components of the battery housing of FIG. 15A, according to some embodiments. Only components with contributions greater than 1% are included. Here, an omega plate absorbed 7.4% of the energy, a trapeze plate absorbed 21.3% of the energy, a c-profile plate absorbed 54.8% of the energy, the side cross members absorbed 9.4% of the energy, the rear cross members absorbed 3% of the energy, and the rear cover absorbed 2.3% of the energy.

The results of the study show that a deformable frame of the battery housing structure absorbs the greatest amount of impact energy, while the interior space, i.e. battery compartment, shows relatively low deformation compared to the frame. Further, limited plastic deformation in the bottom tray, i.e. lower protection cover, indicates that most of the space for the batteries would remain intact in a collision or other impact event.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. A steel battery housing for a vehicle comprising:
   an upper protection cover;
   a lower protection cover;
   an internal crash structure comprising:
     two side cross members;
     a rear cross member;
     a front plate; and
     a front cross member; and
   two side crash structures attached to the internal crash structure, wherein each side crash structure comprises a first plate comprising an outward facing omega shaped plate, a second plate comprising an inward facing trapeze shaped plate, and a third plate comprising an inward facing c-profile shaped plate, and wherein each of the first, second and third plates has a cross section comprising:
     a first portion;
     two secondary portions that extend from the first portion at a first angle; and
     flange portions that extend from each secondary portion at a second angle;
   wherein the first angle of the trapeze shaped plate is greater than about 90° and the second angle of the trapeze shaped plate is greater than about 90°;
   wherein the two side crash structures, the two side cross members, the rear cross member, the front plate, and the front cross member are configured to absorb 98% of crash energy;
   wherein each of the second and third plate are directly contacting the first plate; and,
   wherein the second plate is encompassed by the first plate and the third plate.

2. The steel battery housing of claim 1, wherein the c-profile shaped plate comprises deformation beats.

3. The steel battery housing of claim 1, wherein the first angle of the omega shaped plate is greater than about 90°, and the second angle of the omega plate is greater than about 90°.

4. The steel battery housing of claim 1, wherein the first angle of the c-profile shaped plate is greater than about 90°, and the second angle of the c-profile shaped plate is greater than about 90°.

5. The steel battery housing of claim 1, wherein the flange portions extend in an outwards direction.

6. The steel battery housing of claim 1, wherein the first portion of each plate is oriented substantially vertically.

7. The steel battery housing of claim 1, wherein the flange portions of each plate is oriented substantially vertically.

8. The steel battery housing of claim 1, wherein the first angle of the first plate is substantially similar to the first angle of the third plate.

9. The steel battery housing of claim 1, wherein the first angle of each plate is substantially similar the second angle of each plate.

10. The steel battery housing of claim 1, wherein the side crash structure further comprises a front cover.

11. The steel battery housing of claim 1, wherein the side crash structure further comprises a rear cover.

12. The steel battery housing of claim 1, wherein a material of the upper protection cover comprises an HSLA steel sheet metal of up to 550 Mpa YS.

13. The steel battery housing of claim 1, wherein a material of the internal crash structure comprises an AHSS steel sheet metal of up to 1,200 Mpa ultimate tensile strength (UTS).

14. The steel battery housing of claim 1, wherein a material of the side crash structure comprises an advanced high strength steel sheet of up to 980 Mpa UTS.

15. The steel battery housing of claim 1, wherein a material of the lower protection cover comprises an HR-HSLA-420LA steel alloy sheet metal.

16. The steel battery housing of claim 1, wherein the rear cross member comprises a primary rear cross member and a secondary rear cross member.

17. The steel battery housing of claim 1, wherein each of the first, second and third plates is oriented so as to extend parallel to one another.

18. The steel battery housing of claim 1, wherein the internal crash structure further comprises a c-profile bar.

* * * * *